United States Patent
Jenks

(10) Patent No.: US 10,389,208 B2
(45) Date of Patent: Aug. 20, 2019

(54) HVAC ACTUATOR WITH ONE-WAY CLUTCH MOTOR

(71) Applicant: Johnson Controls Technology Company, Holland, MI (US)

(72) Inventor: Russell T. Jenks, Racine, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 151 days.

(21) Appl. No.: 15/065,719

(22) Filed: Mar. 9, 2016

(65) Prior Publication Data
US 2017/0264163 A1  Sep. 14, 2017

(51) Int. Cl.
| | |
|---|---|
| *H02K 7/08* | (2006.01) |
| *H02K 7/10* | (2006.01) |
| *H02K 7/108* | (2006.01) |
| *H02K 7/00* | (2006.01) |
| *H02K 5/173* | (2006.01) |

(52) U.S. Cl.
CPC ............. *H02K 7/108* (2013.01); *H02K 5/173* (2013.01); *H02K 7/003* (2013.01); *H02K 7/08* (2013.01); *H02K 7/10* (2013.01)

(58) Field of Classification Search
CPC .. H02K 7/00; H02K 7/06; H02K 7/10; H02K 7/102; H02K 7/108; H02K 7/11; H02K 7/116; H02K 7/1166; H02K 7/14; H02K 11/21; B60T 13/74; B60T 13/741; F16D 57/00; F16D 57/002; F16D 59/00; F16D 65/18; F16H 25/20; B66D 1/00
See application file for complete search history.

(56) References Cited

U.S. PATENT DOCUMENTS

| | | | | |
|---|---|---|---|---|
| 4,307,629 A | * | 12/1981 | Moller | F16H 3/74 475/255 |
| 4,346,615 A | * | 8/1982 | Yoneda | F02N 15/06 192/114 R |
| 4,422,786 A | * | 12/1983 | Piptone | B41J 33/14 400/196.1 |
| 4,502,429 A | * | 3/1985 | Ebihara | F02N 11/00 123/179.22 |
| 4,508,318 A | * | 4/1985 | Maeda | B66D 1/58 192/48.3 |

(Continued)

FOREIGN PATENT DOCUMENTS

| | | |
|---|---|---|
| JP | S60-131046 | 7/1985 |
| WO | WO 2013/155615 | 10/2013 |
| WO | WO 2013/176189 | 11/2013 |

OTHER PUBLICATIONS

Search Report for International Application No. PCT/US2017/018436, dated Jul. 4, 2017, 13 pages.

*Primary Examiner* — Tran N Nguyen
(74) *Attorney, Agent, or Firm* — Foley & Lardner LLP

(57) ABSTRACT

An actuator in a HVAC system includes a drive device and a motor coupled to the drive device. The drive device is configured to attach to a movable HVAC component and to drive the movable HVAC component between multiple positions. The motor includes a shell defining an outer perimeter of the motor, a rotor shaft contained within the shell and configured to rotate when an electric current is applied to the motor, a drive shaft extending through the shell and coupled to the drive device, and a one-way clutch contained within the shell and rotatably coupling the rotor shaft to the drive shaft.

18 Claims, 14 Drawing Sheets

(56) References Cited

U.S. PATENT DOCUMENTS

| | | | | |
|---|---|---|---|---|
| 4,697,991 | A * | 10/1987 | Tsukahara | F04B 17/05 |
| | | | | 192/48.92 |
| 4,838,122 | A * | 6/1989 | Takamiya | B62M 11/18 |
| | | | | 192/47 |
| 5,014,563 | A * | 5/1991 | Isozumi | F02N 15/063 |
| | | | | 192/42 |
| 5,304,879 | A * | 4/1994 | Suzuki | G11B 17/028 |
| | | | | 310/67 R |
| 6,288,464 | B1 * | 9/2001 | Torii | H02K 7/108 |
| | | | | 192/223.2 |
| 7,070,033 | B2 * | 7/2006 | Jansen | F16D 41/20 |
| | | | | 192/110 R |
| 2003/0030337 | A1 * | 2/2003 | Aoki | F16K 31/041 |
| | | | | 310/68 R |
| 2004/0104090 | A1 * | 6/2004 | Jansen | F16D 41/20 |
| | | | | 192/41 S |
| 2006/0287149 | A1 * | 12/2006 | Mao | H02K 1/146 |
| | | | | 475/5 |
| 2012/0299415 | A1 * | 11/2012 | Antchak | F16D 41/206 |
| | | | | 310/78 |
| 2013/0082579 | A1 * | 4/2013 | Bailey | D06F 37/304 |
| | | | | 310/75 R |
| 2014/0296008 | A1 * | 10/2014 | Wu | B62K 11/02 |
| | | | | 474/69 |
| 2015/0260425 | A1 | 9/2015 | Romanowich et al. | |
| 2016/0061480 | A1 | 3/2016 | Alexander | |

\* cited by examiner

HVAC ACTUATOR WITH ONE-WAY CLUTCH MOTOR

BACKGROUND

The present invention relates generally to actuators in a heating, ventilating, or air conditioning (HVAC) system and more particularly to HVAC actuators that use brushless direct current (BLDC) motors.

HVAC actuators are used to operate a wide variety of HVAC components such as air dampers, fluid valves, air handling units, and other components that are typically used in HVAC systems. For example, an actuator may be attached to a damper in a HVAC system and may be used to drive the damper between an open position and a closed position. An HVAC actuator typically includes a motor and a drive device (e.g., a hub, a drive train, etc.) that is driven by the motor and attached to the HVAC component.

SUMMARY

One implementation of the present disclosure is an actuator in a HVAC system. The actuator includes a drive device and a motor coupled to the drive device. The drive device is configured to attach to a movable HVAC component and to drive the movable HVAC component between multiple positions. The motor includes a shell defining an outer perimeter of the motor, a rotor shaft contained within the shell and configured to rotate when an electric current is applied to the motor, a drive shaft extending through the shell and coupled to the drive device, and a one-way clutch contained within the shell and rotatably coupling the rotor shaft to the drive shaft.

In some embodiments, the one-way clutch is configured to engage both the rotor shaft and the drive shaft when the rotor shaft rotates in a first direction such that the drive shaft is driven by the rotor shaft in the first direction. The one-way clutch can be configured to slip relative to at least one of the rotor shaft and the drive shaft when the rotor shaft rotates in a second direction opposite the first direction to allow rotation of the rotor shaft relative to the drive shaft in the second direction.

In some embodiments, the motor is configured to provide torque to the drive device in the first direction. The actuator can include a return spring coupled to the drive device and configured to provide torque to the drive device in the second direction. In some embodiments, the actuator includes an end stop defining an end of a mechanical range of motion for at least one of the drive device and the movable HVAC component. The torque provided by the return spring can cause the drive device to move toward the end stop and to drive the motor in the second direction.

In some embodiments, the motor gains rotational inertia as the motor is driven in the second direction. The drive device can be configured to stop upon reaching the end stop. The one-way clutch can be configured to allow continued rotation of the motor in the second direction after the drive device stops to gradually dissipate the rotational inertia of the motor.

In some embodiments, the actuator includes a pinion gear rotatably fixed to an end of the drive shaft outside the shell and configured to drive the drive device. The pinion gear can be injection molded from a polymer material and press fit onto the end of the drive shaft.

In some embodiments, the one-way clutch includes a wrap spring wrapped around an end of the rotor shaft and an end of the drive shaft. The wrap spring can be fixed to one of the rotor shaft and the drive shaft. The wrap spring can be configured to slip relative to the other of the rotor shaft and the drive shaft when the rotor shaft rotates in the second direction. In some embodiments, the shell includes an outer rotor configured to rotate when the electric current is applied to the motor. The rotor shaft can be rotatably fixed to the outer rotor.

In some embodiments, the actuator includes stator windings contained within the shell and a flange coupled to the stator windings. The flange may define a surface of the shell. In some embodiments, the stator windings includes a central axial channel. The rotor shaft, the drive shaft, and the one-way clutch can be at least partially contained within the central axial channel. In some embodiments, the actuator includes a first bearing and a second bearing located within the central axial channel. The first bearing can be configured to facilitate rotation of the rotor shaft relative to the stator windings. T second bearing can be configured to facilitate rotation of the stator shaft relative to the stator windings.

Another implementation of the present disclosure is an actuator in a HVAC system. The actuator includes a drive device and a motor. The drive device is configured to attach to a movable HVAC component and to drive the movable HVAC component between multiple positions. The motor includes a one-way clutch contained within an outer perimeter of the motor. The one-way clutch is configured to rotatably couple the motor to the drive device when the motor rotates in a first direction and to allow the motor to rotate relative to the drive device when the motor rotates in a second direction opposite the first direction.

In some embodiments, the one-way clutch includes a rotor shaft rotatably coupled to the motor and configured to rotate when an electric current is applied to the motor, a drive shaft rotatably coupled to the drive device and configured to drive the drive device, and a wrap spring wrapped around an end of the rotor shaft and an end of the drive shaft.

In some embodiments, the wrap spring is configured to engage both the rotor shaft and the drive shaft when the rotor shaft rotates in the first direction such that the drive shaft is driven by the rotor shaft in the first direction. The wrap spring can be configured to slip relative to at least one of the rotor shaft and the drive shaft when the rotor shaft rotates in the second direction to allow rotation of the rotor shaft relative to the drive shaft in the second direction.

In some embodiments, the motor includes an outer rotor configured to rotate when the electric current is applied to the motor. The one-way clutch can be contained within a perimeter of the outer rotor. In some embodiments, the actuator includes a pinion gear rotatably fixed to an end of a drive shaft outside the perimeter of the motor and configured to drive the drive device.

In some embodiments, the motor is configured to provide torque to the drive device in the first direction. The actuator can include a return spring coupled to the drive device and configured to provide torque to the drive device in the second direction. In some embodiments, the actuator includes an end stop defining an end of a mechanical range of motion for at least one of the drive device and the movable HVAC component. The torque provided by the return spring can cause the drive device to move toward the end stop and to drive the motor in the second direction.

In some embodiments, the motor gains rotational inertia as the motor is driven in the second direction. The drive device can be configured to stop upon reaching the end stop. The one-way clutch can be configured to allow continued rotation of the motor in the second direction after the drive device stops to gradually dissipate the rotational inertia of the motor.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, an HVAC actuator with a one-way clutch motor is shown, according to some embodiments. The actuator can be a damper actuator, a valve actuator, a fan actuator, a pump actuator, or any other type of actuator that can be used in a HVAC system. The actuator includes a motor and a drive device driven by the motor. In some embodiments, the motor is a brushless direct current (BLDC) motor. The drive device is attached to a movable HVAC component and configured to drive the movable HVAC component between multiple positions.

The actuator includes a one-way clutch mechanism contained within a perimeter of the motor. The one-way clutch mechanism can rotationally couple a rotor shaft of the motor to a drive shaft of the motor. In some embodiments, the rotor shaft is rotationally fixed to a rotary component of the motor (e.g., a rotor) and configured to rotate when an electric current is applied to the motor. The drive shaft can extend through the perimeter of the motor. In some embodiments, a pinion gear is fixed (e.g., press-fit) to an end of the drive shaft.

The one-way clutch mechanism allows the motor to continue rotating in a reverse direction after the drive device stops rotating. For example, a return spring may cause the actuator to return to an end position by applying a torque which drives the actuator in the reverse direction. The one-way clutch mechanism may cause the motor to be driven in the reverse direction by the drive device as the actuator rotates in the reverse direction. The drive device may stop rotating once the drive device reaches the end of a mechanical range of travel for the actuator. This may occur when the drive device or HVAC component operated by the actuator encounters a physical end stop. In some instances, the drive device and the drive shaft suddenly stop rotating once the end stop is reached (e.g., upon impacting the end stop).

The rotational momentum of the motor may cause the motor to continue rotating relative to the drive shaft and the drive device. The one-way clutch mechanism permits such rotation by allowing the rotor shaft to slip relative to the drive shaft when the rotor shaft rotates in the reverse direction. Such slippage allows the rotational momentum of the motor to gradually decrease rather than forcing the motor to stop suddenly. This feature reduces the impact force experienced when the end stop is reached and reduces the stress on the rotating components of the actuator. Additional features and advantages of the actuator are described in greater detail below.

Building Management System and HVAC System

Figure 1:
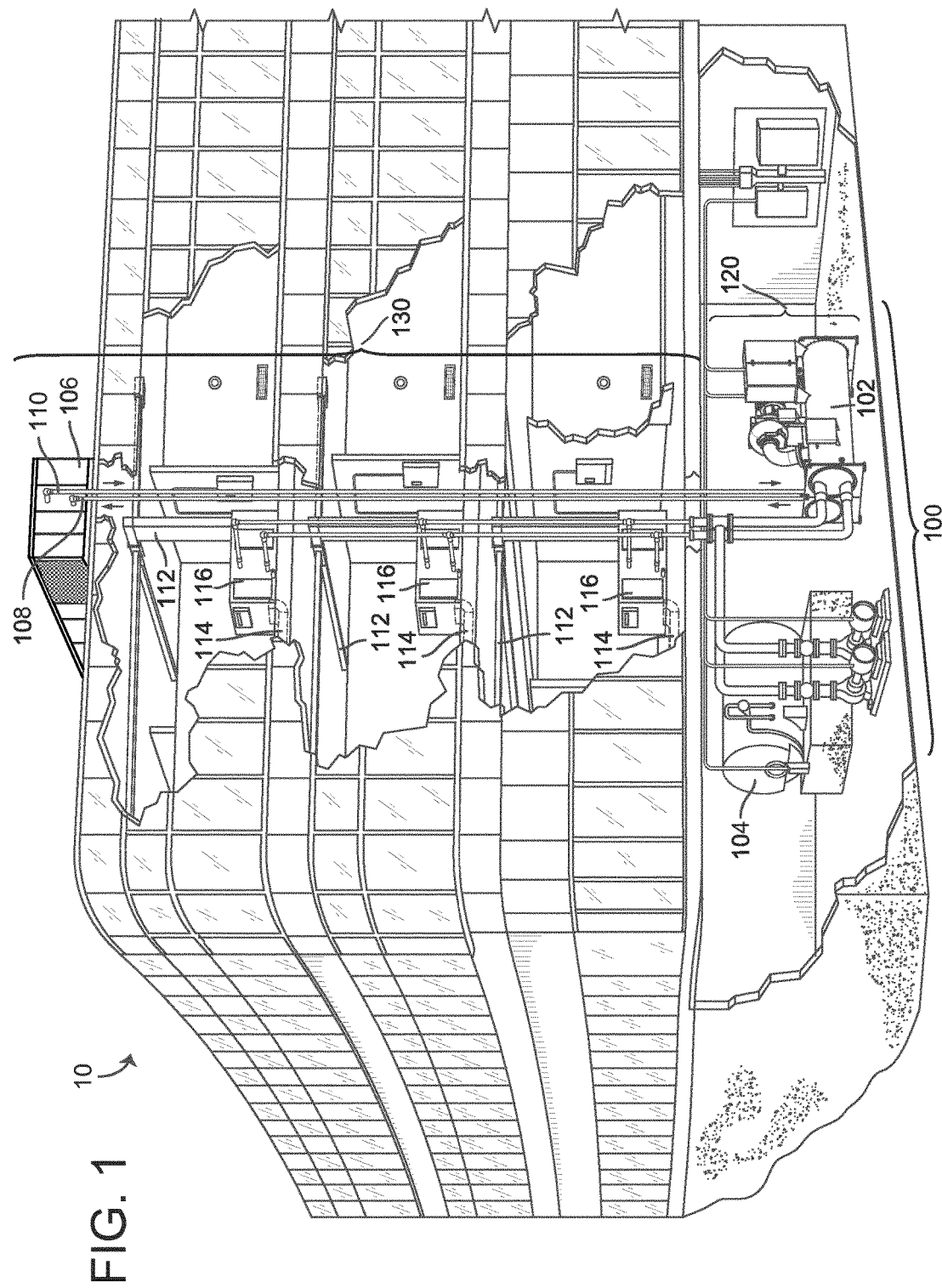
FIG. 1 is a drawing of a building equipped with a heating, ventilating, or air conditioning (HVAC) system and a building management system (BMS), according to some embodiments.

Referring now to FIGS. 1-4, an exemplary building management system (BMS) and HVAC system in which the systems and methods of the present invention may be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
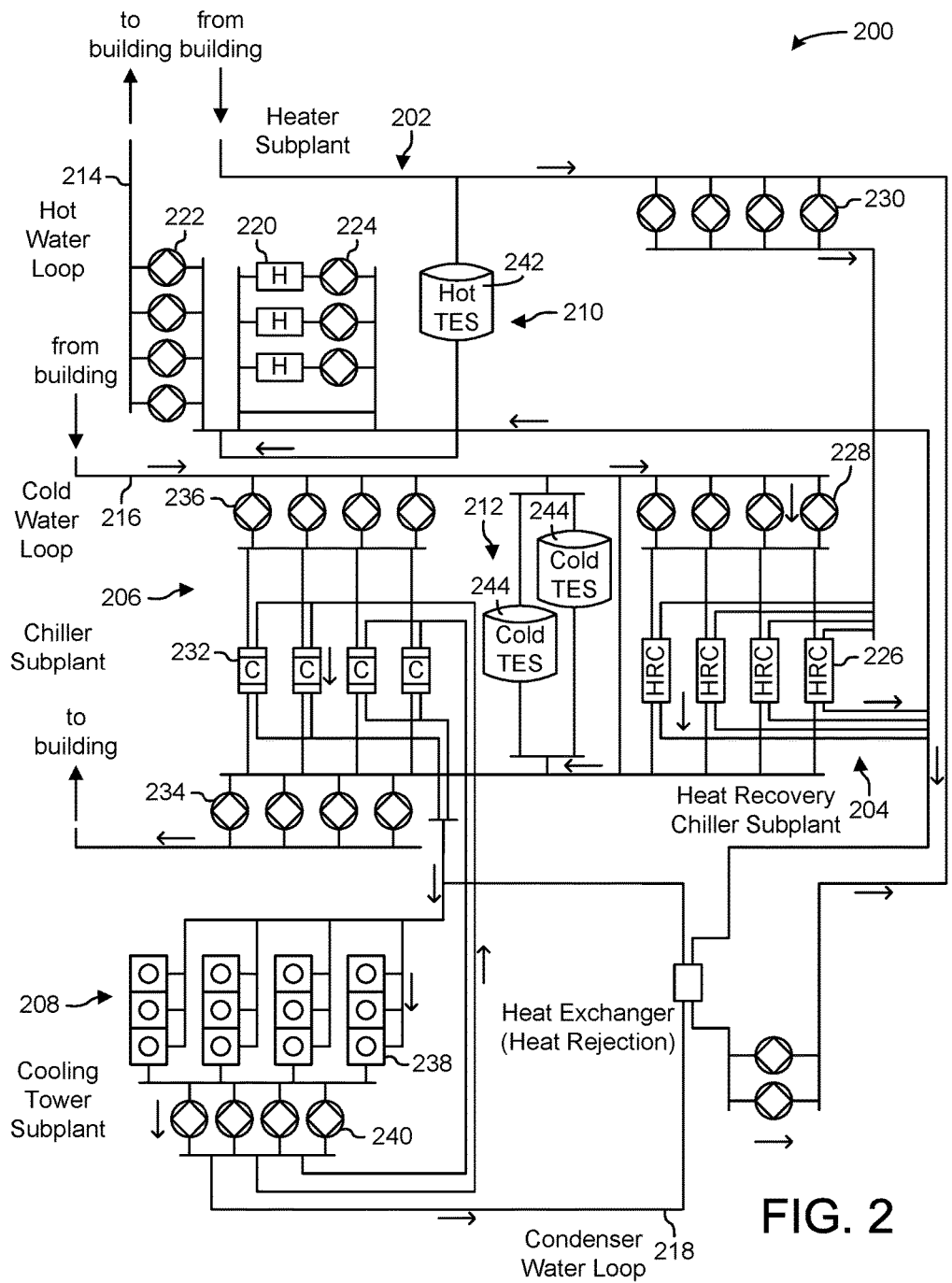
FIG. 2 is a schematic diagram of a waterside system which may be used to support the HVAC system of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
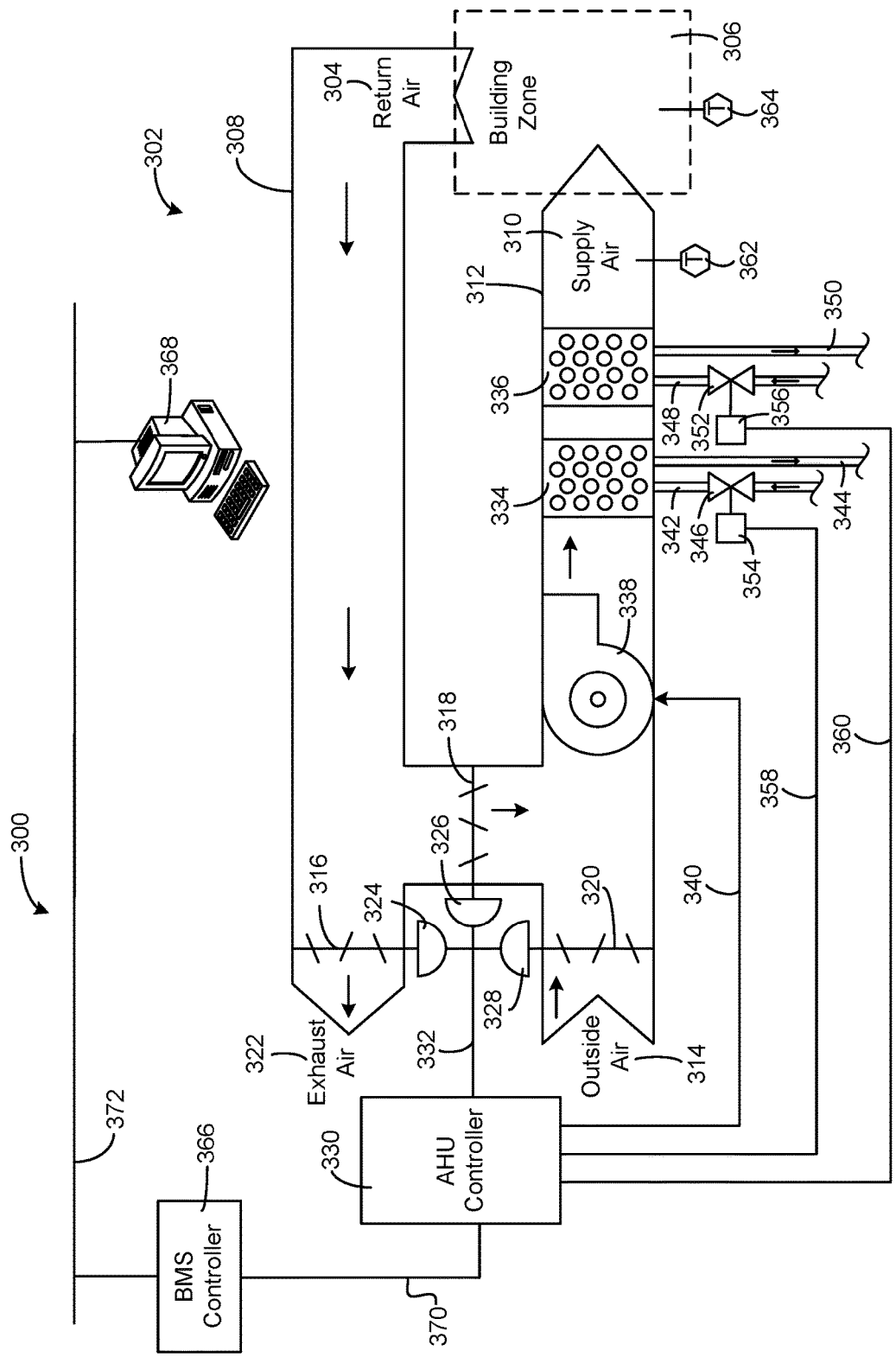
FIG. 3 is a block diagram of an airside system which may be used as part of the HVAC system of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
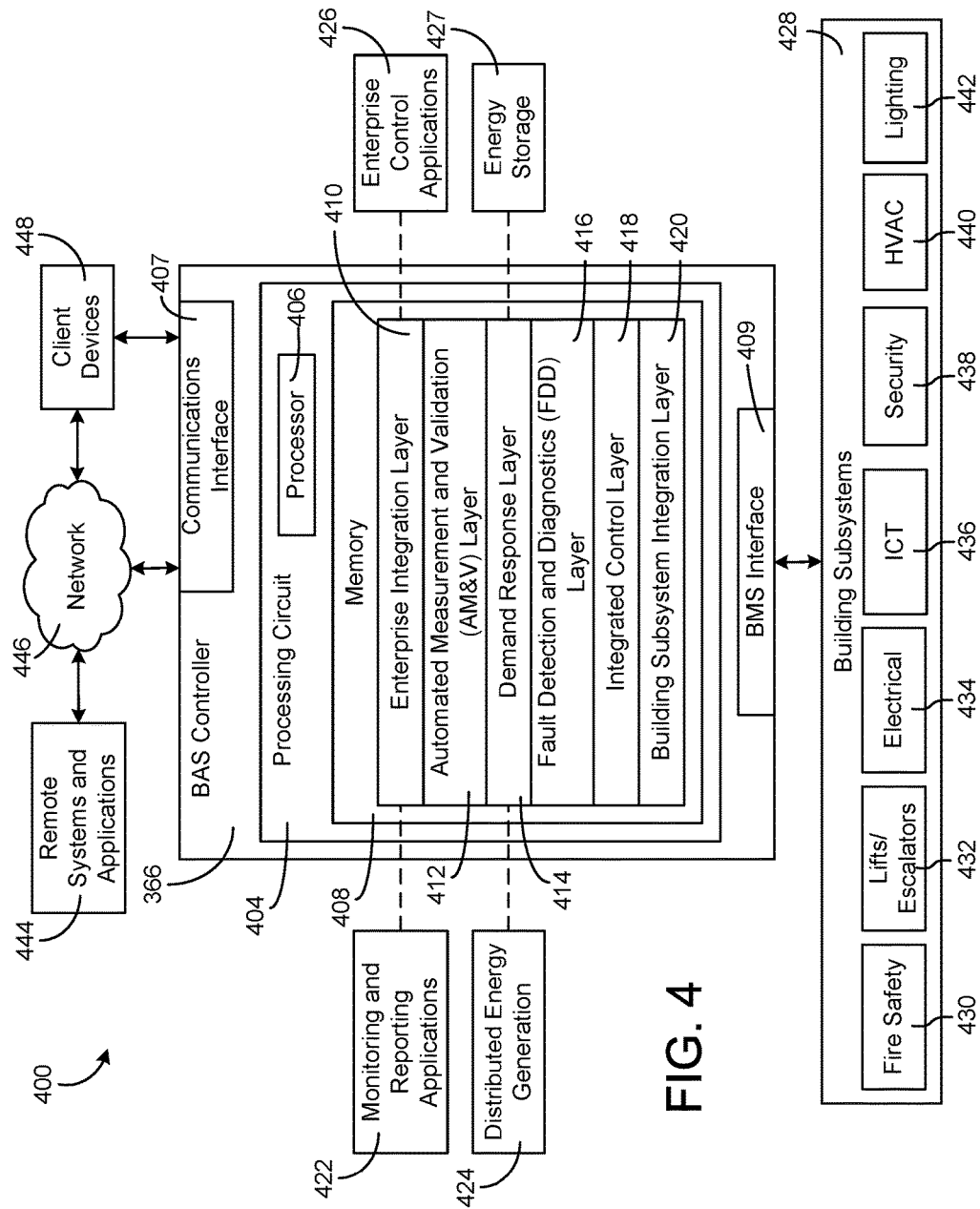
FIG. 4 is a block diagram of a BMS which may be implemented in the building of FIG. 1, according to some embodiments.

Referring now to FIG. 4, a block diagram of a building management system (BMS) 400 is shown, according to some embodiments. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In some embodiments, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

HVAC Actuator

Figure 5:
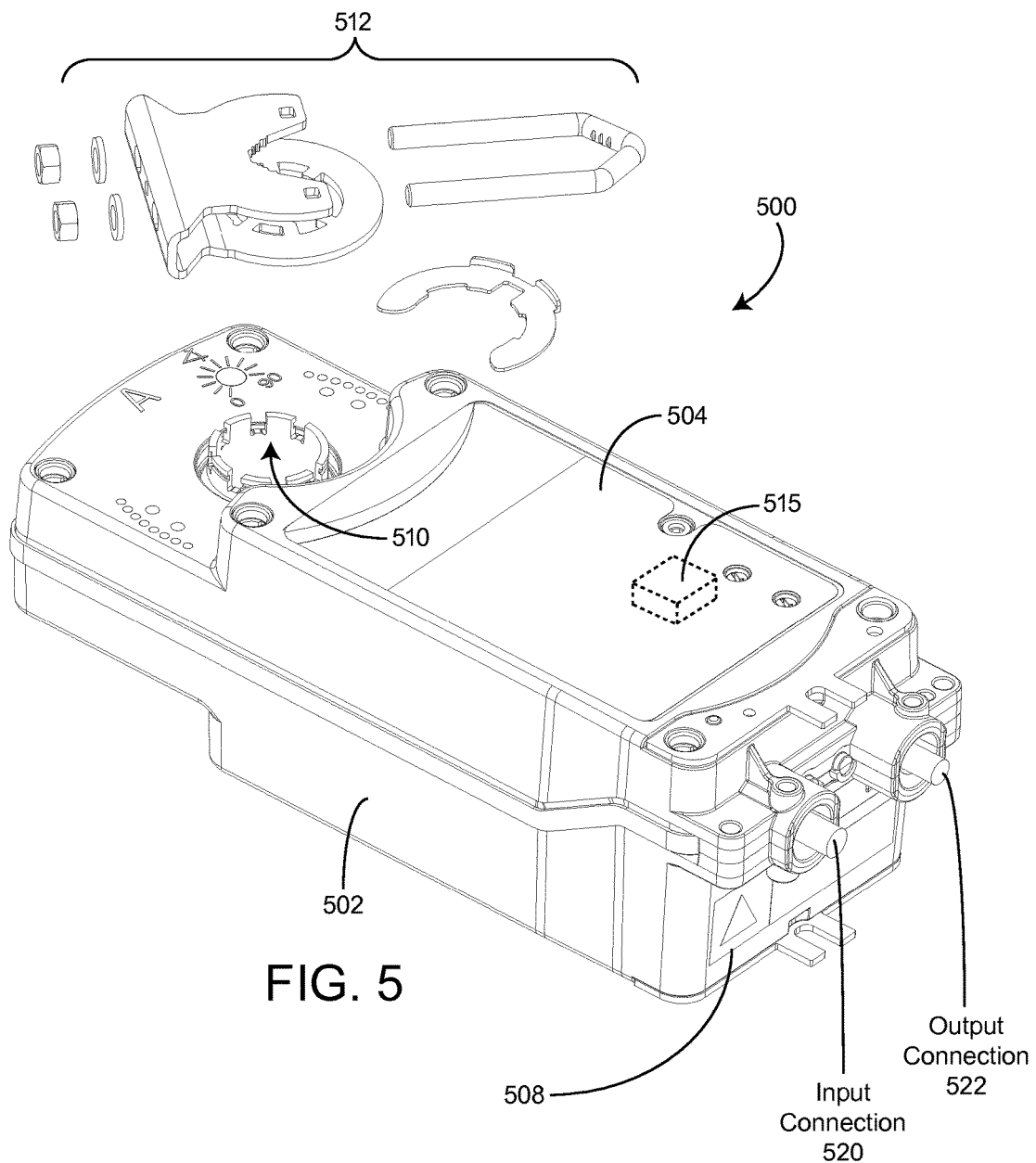
FIG. 5 is a perspective view of an actuator which may be used in the HVAC system of FIG. 1, the waterside system of FIG. 2, the airside system of FIG. 3, or the BMS of FIG. 4 to control a HVAC component, according to some embodiments.
Figure 7:
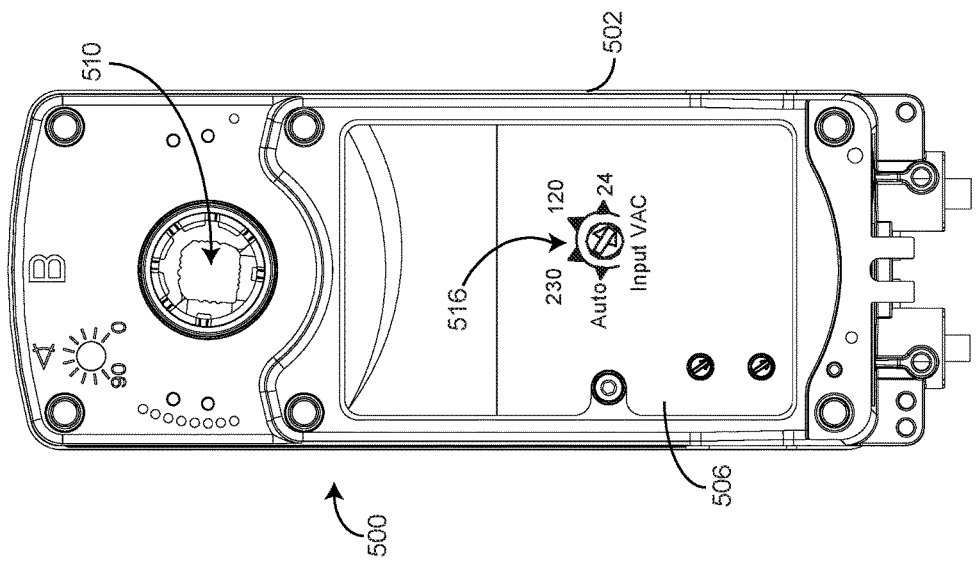
FIG. 7 is a rear view of the actuator shown in FIG. 5, according to some embodiments.
Figure 6:
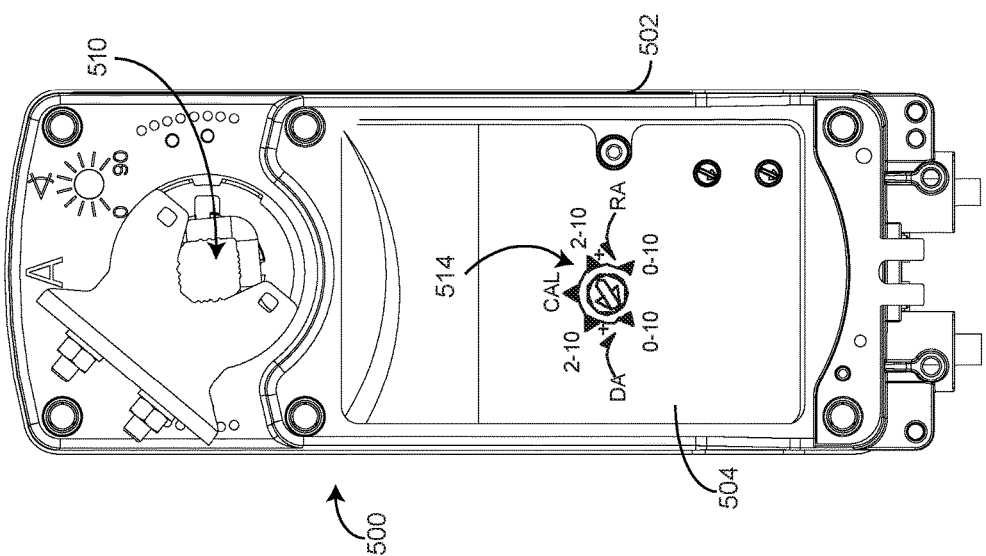
FIG. 6 is a front view of the actuator shown in FIG. 5, according to some embodiments.

Referring now to FIGS. 5-7, an actuator 500 for use in a HVAC system is shown, according to some embodiments. In some implementations, actuator 500 may be used in HVAC system 100, waterside system 200, airside system 300, or BMS 400, as described with reference to FIGS. 1-4. For example, actuator 500 may be a damper actuator, a valve actuator, a fan actuator, a pump actuator, or any other type of actuator that can be used in a HVAC system or BMS. In various embodiments, actuator 500 may be a linear actuator (e.g., a linear proportional actuator), a non-linear actuator, a spring return actuator, or a non-spring return actuator.

Actuator 500 is shown to include a housing 502 having a front side 504 (i.e., side A), a rear side 506 (i.e., side B) opposite front side 504, and a bottom 508. Housing 502 may contain the mechanical and processing components of actuator 500. In some embodiments, housing 502 contains a brushless direct current (BLDC) motor and a processing circuit configured to provide a pulse width modulated (PWM) DC output to control the speed of the BLDC motor. The processing circuit may be configured to compare a representation of the electric current output to the BLDC motor to a threshold and may hold the PWM DC output in an off state when the current exceeds the threshold. The processing circuit may also be configured to set the PWM DC output to zero and then ramp up the PWM DC output when actuator 500 approaches an end stop. The internal components of actuator 500 are described in greater detail with reference to FIGS. 8-12.

Actuator 500 is shown to include a drive device 510. Drive device 510 may be a drive mechanism, a hub, or other device configured to drive or effectuate movement of a HVAC system component. For example, drive device 510 may be configured to receive a shaft of a damper, a valve, or any other movable HVAC system component in order to drive (e.g., rotate) the shaft. In some embodiments, actuator 500 includes a coupling device 512 configured to aid in coupling drive device 510 to the movable HVAC system component. For example, coupling device 512 may facilitate attaching drive device 510 to a valve or damper shaft.

Actuator 500 is shown to include an input connection 520 and an output connection 522. In some embodiments, input connection 520 and output connection 522 are located along bottom 508. In other embodiments, input connection 520 and output connection 522 may be located along one or more other surfaces of housing 502. Input connection 520 may be configured to receive a control signal (e.g., a voltage input signal) from an external system or device. Actuator 500 may use the control signal to determine an appropriate PWM DC output for the BLDC motor. In some embodiments, the control signal is received from a controller such as an AHU controller (e.g., AHU controller 330), an economizer controller, a supervisory controller (e.g., BMS controller 366), a zone controller, a field controller, an enterprise level controller, a motor controller, an equipment-level controller (e.g., an actuator controller) or any other type of controller that can be used in a HVAC system or BMS.

In some embodiments, the control signal is a DC voltage signal. Actuator 500 may be a linear proportional actuator configured to control the position of drive device 510 according to the value of the DC voltage received at input connection 520. For example, a minimum input voltage (e.g., 0.0 VDC) may correspond to a minimum rotational position of drive device 510 (e.g., 0 degrees, −5 degrees, etc.), whereas a maximum input voltage (e.g., 10.0 VDC) may correspond to a maximum rotational position of drive device 510 (e.g., 90 degrees, 95 degrees, etc.). Input voltages between the minimum and maximum input voltages may cause actuator 500 to move drive device 510 into an intermediate position between the minimum rotational position and the maximum rotational position. In other embodiments, actuator 500 may be a non-linear actuator or may use different input voltage ranges or a different type of input signal (e.g., AC voltage or current) to control the position and/or rotational speed of drive device 510.

In some embodiments, the control signal is an AC voltage signal. Input connection 520 may be configured to receive an AC voltage signal having a standard power line voltage (e.g., 120 VAC or 230 VAC at 50/60 Hz). The frequency of the voltage signal may be modulated (e.g., by a controller for actuator 500) to adjust the rotational position and/or speed of drive device 510. In some embodiments, actuator 500 uses the voltage signal to power various components of actuator 500. Actuator 500 may use the AC voltage signal received via input connection 520 as a control signal, a source of electric power, or both. In some embodiments, the voltage signal is received at input connection 520 from a power supply line that provides actuator 500 with an AC voltage having a constant or substantially constant frequency (e.g., 120 VAC or 230 VAC at 50 Hz or 60 Hz). Input connection 520 may include one or more data connections (separate from the power supply line) through which actuator 500 receives control signals from a controller or another actuator (e.g., 0-10 VDC control signals).

In some embodiments, the control signal is received at input connection 520 from another actuator. For example, if multiple actuators are interconnected in a tandem arrangement, input connection 520 may be connected (e.g., via a communications bus) to the output data connection of another actuator. One of the actuators may be arranged as a master actuator with its input connection 520 connected to a controller, whereas the other actuators may be arranged as slave actuators with their respective input connections connected to the output connection 522 of the master actuator.

Output connection 522 may be configured to provide a feedback signal to a controller of the HVAC system or BMS in which actuator 500 is implemented (e.g., an AHU controller, an economizer controller, a supervisory controller, a zone controller, a field controller, an enterprise level controller, etc.). The feedback signal may indicate the rotational position and/or speed of actuator 500. In some embodiments, output connection 522 may be configured to provide a control signal to another actuator (e.g., a slave actuator) arranged in tandem with actuator 500. Input connection 520 and output connection 522 may be connected to the controller or the other actuator via a communications bus. The communications bus may be a wired or wireless communications link and may use any of a variety of disparate communications protocols (e.g., BACnet, LON, WiFi, Bluetooth, NFC, TCP/IP, etc.).

Still referring to FIGS. 5-7, actuator 500 is shown to include a first user-operable switch 514 located along front side 504 (shown in FIG. 6) and a second user-operable switch 516 located along rear side 506 (shown in FIG. 7). Switches 514-516 may be potentiometers or any other type of switch (e.g., push button switches such as switch 515, dials, flippable switches, etc.). Switches 514-516 may be used to set actuator 500 to a particular operating mode or to configure actuator 500 to accept a particular type of input. However, it should be understood that switches 514-516 are optional components and are not required for actuator 500 to perform the processes described herein. As such, one or more of switches 514-516 may be omitted without departing from the teachings of the present invention.

Referring particularly to FIG. 6, switch 514 may be a mode selection switch having a distinct number of modes or positions. Switch 514 may be provided for embodiments in which actuator 500 is a linear proportional actuator that controls the position of drive device 510 as a function of a DC input voltage received at input connection 520. In some embodiments, the function of mode selection switch 514 is the same or similar to the function of the mode selection switch described in U.S. patent application Ser. No. 14/727, 284, filed Jun. 1, 2015, the entire disclosure of which is incorporated by reference herein. For example, the position of mode selection switch 514 may be adjusted to set actuator 500 to operate in a direct acting mode, a reverse acting mode, or a calibration mode. In some embodiments, switch 514 is an optional component and can be omitted.

Mode selection switch 514 is shown to include a 0-10 direct acting (DA) mode, a 2-10 DA mode, a calibration (CAL) mode, a 2-10 reverse acting (RA) mode, and a 0-10 RA mode. According to other exemplary embodiments, mode selection switch 514 may have a greater or smaller number of modes and/or may have modes other than listed as above. The position of mode selection switch 514 may define the range of DC input voltages that correspond to the rotational range of drive device 510. For example, when mode selection switch 514 is set to 0-10 DA, an input voltage of 0.0 VDC may correspond to 0 degrees of rotation position for drive device 510. For this same mode, an input voltage of 1.7 VDC may correspond to 15 degrees of rotation position, 3.3 VDC may correspond to 30 degrees of rotation position, 5.0 VDC may correspond to 45 degrees of rotation position, 6.7 VDC may correspond to 60 degrees of rotation position, 8.3 VDC may correspond to 75 degrees of rotation position, and 10.0 VDC may correspond to 90 degrees of rotation position. It should be understood that these voltages and corresponding rotational positions are merely exemplary and may be different in various implementations.

Referring particularly to FIG. 7, switch 516 may be a mode selection switch having a distinct number or modes or positions. Switch 516 may be provided for embodiments in which actuator 500 is configured to accept an AC voltage at input connection 520. In some embodiments, the function of mode selection switch 516 is the same or similar to the function of the mode selection switch described in U.S. patent application Ser. No. 14/475,141, filed Sep. 1, 2014, the entire disclosure of which is incorporated by reference herein. For example, the position of switch 516 may be adjusted to set actuator 500 to accept various different AC voltages at input connection 520. In some embodiments, switch 516 is an optional component and can be omitted.

Mode selection switch 516 is shown to include a "24 VAC" position, a "120 VAC" position, a "230 VAC" position, an "Auto" position. Each position of switch 516 may correspond to a different operating mode. According to other exemplary embodiments, switch 516 may have a greater or lesser number of positions and/or may have modes other than the modes explicitly listed. The different operating modes indicated by switch 516 may correspond to different voltage reduction factors applied to the input voltage received at input connection 520. For example, with switch 516 in the 24 VAC position, actuator 500 may be configured to accept an input voltage of approximately 24 VAC (e.g., 20-30 VAC) at input connection 520 and may apply a reduction factor of approximately 1 to the input voltage. With switch 516 in the 120 VAC position, actuator 500 may be configured to accept an input voltage of approximately 120 VAC (e.g., 100-140 VAC, 110-130 VAC, etc.) at input connection 520 and may apply a reduction factor of approximately 5 (e.g., 3-7, 4-6, 4.5-5.5, etc.) to the input voltage. With switch 516 in the 230 VAC position, actuator 500 may be configured to accept an input voltage of approximately 230 VAC (e.g., 200-260 VAC, 220-240 VAC, etc.) at input connection 520 and may apply a reduction factor of approximately 9.6 (e.g., 7-13, 8-12, 9-10, etc.) to the input voltage. With switch 516 in the "Auto" position, actuator 500 may be configured automatically determine the input voltage received at input connection 520 and may adjust the voltage reduction factor accordingly.

Speed and Torque Control System

Figure 8:
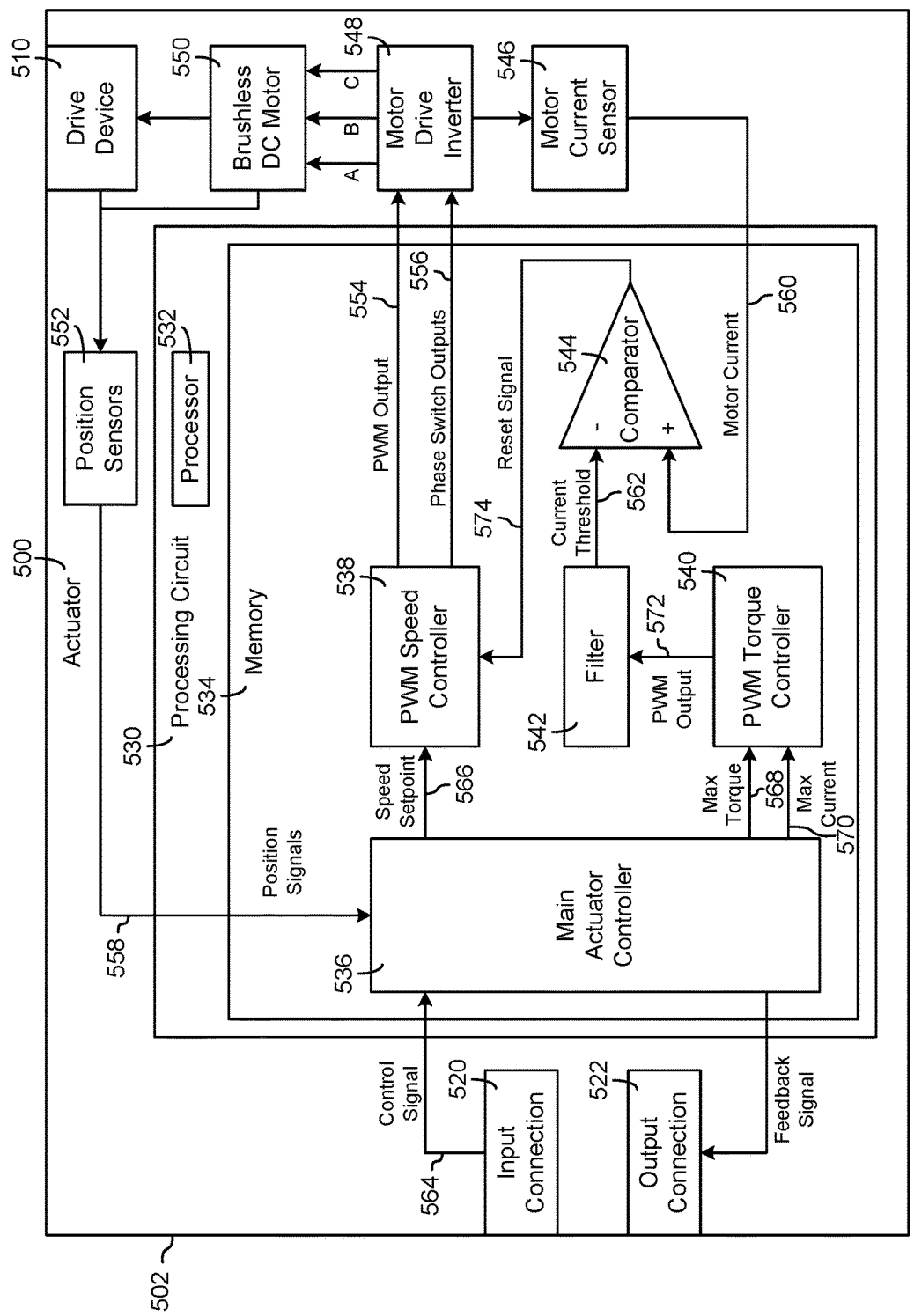
FIG. 8 is a block diagram illustrating the actuator of FIGS. 5-7 in greater detail, according to some embodiments.

Referring now to FIG. 8, a block diagram illustrating actuator 500 in greater detail is shown, according to some embodiments. Actuator 500 is shown to include input connection 520, output connection 522, and drive device 510 contained within housing 502. Actuator 500 is shown to further include a brushless DC (BLDC) motor 550 connected to drive device 510, a motor drive inverter 548 (e.g., an H-bridge) configured to provide a three-phase pulse width modulated (PWM) voltage output to BLDC motor 550, a motor current sensor 546 (e.g., a current sense resistor) configured to sense the electric current provided to BLDC motor 550, and position sensors 552 configured to measure the rotational position of BLDC motor 550 and/or drive device 510.

BLDC motor 550 may be connected to drive device 510 and may be configured to rotate drive device 510 through a range of rotational positions. For example, a shaft of BLDC motor 550 may be coupled to drive device 510 (e.g., via a drive train or gearing arrangement) such that rotation of the motor shaft causes a corresponding rotation of drive device 510. In some embodiments, the drive train functions as a transmission. The drive train may translate a relatively high speed, low torque output from BLDC motor 550 into a relatively low speed, high torque output suitable for driving a HVAC component connected to drive device 510 (e.g., a damper, a fluid valve, etc.). For example, the drive train may provide a speed reduction of approximately 1000:1, 2500:1, 5000:1, or any other speed reduction as may be suitable for various implementations.

BLDC motor 550 may be configured to receive a three-phase PWM voltage output (e.g., phase A, phase B, phase C) from motor drive inverter 548. The duty cycle of the PWM voltage output may define the rotational speed of BLDC motor 550 and may be determined by processing circuit 530 (e.g., a microcontroller). Processing circuit 530 may increase the duty cycle of the PWM voltage output to increase the speed of BLDC motor 550 and may decrease the duty cycle of the PWM voltage output to decrease the speed of BLDC motor 550. Processing circuit 530 is shown providing a PWM voltage output 554 and phase switch outputs 556 to motor drive inverter 548. Motor drive inverter 548 may use phase switch outputs 556 to apply PWM output 554 to a particular winding of BLDC motor 550. The operation of motor drive inverter 548 is described in greater detail with reference to FIG. 9.

Position sensors 552 may include Hall effect sensors, potentiometers, optical sensors, or other types of sensors configured to measure the rotational position of BLDC motor 550 and/or drive device 510. Position sensors 552 may provide position signals 558 to processing circuit 530. Processing circuit 530 uses position signals 558 to determine whether to operate BLDC motor 550. For example, processing circuit 530 may compare the current position of drive device 510 with a position setpoint received via input connection 520 and may operate BLDC motor 550 to achieve the position setpoint.

Motor current sensor 546 may be configured to measure the electric current provided to BLDC motor 550. Motor current sensor 546 may generate a feedback signal indicating the motor current 560 and may provide feedback signal to processing circuit 530. Processing circuit 530 may be configured to compare the motor current 560 to a threshold 562 (e.g., using comparator 544) and may hold PWM output 554 in an off state when motor current 560 exceeds threshold 562. Processing circuit 530 may also be configured to set PWM output 554 to zero and then ramp up PWM output 554 when the position of drive device 510 approaches an end stop. These and other features of actuator 500 are described in greater detail below.

Still referring to FIG. 8, processing circuit 530 is shown to include a processor 532 and memory 534. Processor 532 may be a general purpose or specific purpose processor, an application specific integrated circuit (ASIC), one or more field programmable gate arrays (FPGAs), a group of processing components, or other suitable processing components. Processor 532 may be configured to execute computer code or instructions stored in memory 534 or received from other computer readable media (e.g., CDROM, network storage, a remote server, etc.).

Memory 534 may include one or more devices (e.g., memory units, memory devices, storage devices, etc.) for storing data and/or computer code for completing and/or facilitating the various processes described in the present disclosure. Memory 534 may include random access memory (RAM), read-only memory (ROM), hard drive storage, temporary storage, non-volatile memory, flash memory, optical memory, or any other suitable memory for storing software objects and/or computer instructions. Memory 534 may include database components, object code components, script components, or any other type of information structure for supporting the various activities and information structures described in the present disclosure. Memory 534 may be communicably connected to processor 532 via processing circuit 530 and may include computer code for executing (e.g., by processor 532) one or more processes described herein. When processor 532 executes instructions stored in memory 534, processor 532 generally configures actuator 500 (and more particularly processing circuit 530) to complete such activities.

Processing circuit 530 is shown to include a main actuator controller 536. Main actuator controller 536 may be configured to receive control signals 564 from input connection 520 (e.g., position setpoints, speed setpoints, etc.) and position signals 558 from position sensors 552. Main actuator controller 536 may be configured to determine the position of BLDC motor 550 and/or drive device 510 based on position signals 558. In some embodiments, main actuator controller 536 calculates the speed of BLDC motor 550 and/or drive device 510 using a difference in the measured positions over time. For example, the speed of BLDC motor 550 may be determined by main actuator controller 536 using a measured time between Hall sensor interrupt signals provided by Hall sensors integral to BLDC motor 550.

Main actuator controller 536 may determine an appropriate speed setpoint 566 for BLDC motor 550 (e.g., in percentage terms, in terms of absolute position or speed, etc.). In some embodiments, main actuator controller 536 provides speed setpoint 566 to PWM speed controller 538. In other embodiments, main actuator controller 536 calculates an appropriate PWM duty cycle to achieve a desired speed and provides the PWM duty cycle to PWM speed controller 538. In some embodiments, main actuator controller 536 calculates speed setpoint 566 based on the position of drive device 510. For example, main actuator controller 536 may be configured to set speed setpoint 566 to zero when the position of drive device is within a predetermined distance from an end stop. Main actuator controller 536 may then cause speed setpoint 566 to ramp up until the end stop is reached. These and other features of main actuator controller 536 are described in greater detail with reference to FIG. 13.

Still referring to FIG. 8, processing circuit 530 is shown to include a PWM speed controller 538. PWM speed controller 538 may receive a speed setpoint 566 and/or a PWM duty cycle from main actuator controller 536. PWM speed controller 538 may generate PWM output 554 (e.g., a PWM DC voltage output) and provide PWM output 554 to motor drive inverter 548. The duty cycle of PWM output 554 may determine the speed of rotation for BLDC motor 550. The width of the output PWM pulses can be adjusted by PWM speed controller 538 to achieve varying commanded motor speeds and/or to obtain varying motor or actuator positions.

Figure 9:
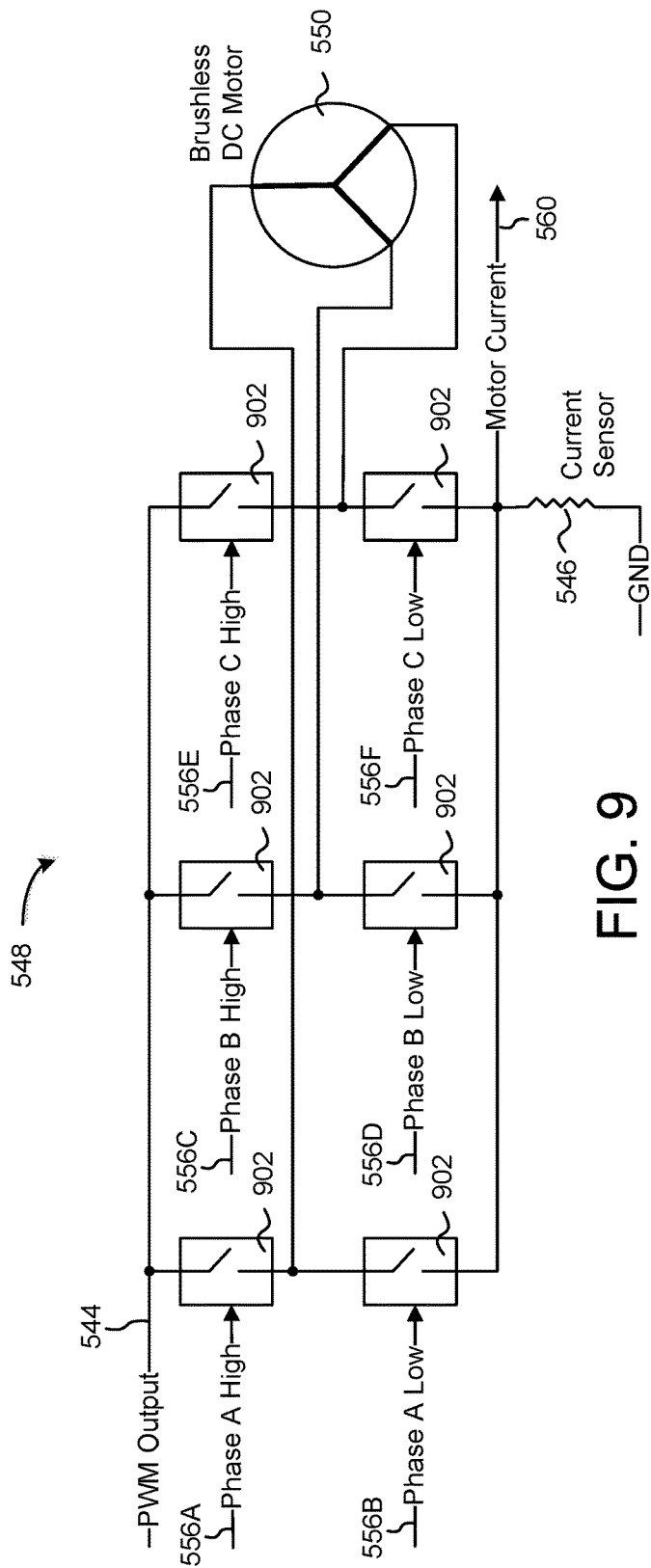
FIG. 9 is a circuit diagram illustrating a motor drive inverter circuit which may be used in the actuator of FIGS. 5-7, according to some embodiments.

In some embodiments, PWM speed controller 538 provides phase switch outputs 556 to motor drive inverter 548. Phase switch outputs 556 may be used by motor driver inverter 548 to control the polarity of the PWM output 554 provided to the windings of BLDC motor 550. In some embodiments, motor drive inverter 548 is an H-bridge. Some embodiments of such an H-bridge is shown in FIG. 9. While an H-bridge is shown in drawings, other switching circuits or controls may be used to controllably vary the phase switching in synchronization with the desired speed or rotation of BLDC motor 550.

Still referring to FIG. 8, motor current sensor 546 may be coupled to motor drive inverter 548 in a manner that allows current sensor 546 to provide an output (e.g., a voltage output) that indicates the amount of the electric current 560 provided to BLDC motor 550 on any phase line. A reading representative of sensed current 560 may be provided from motor current sensor 546 to comparator 544. Comparator 544 may be a discrete electronics part or implemented as part of main actuator controller 536 or another controller that forms a part of processing circuit 530. Comparator 544 may be configured to compare motor current 560 to an electric current threshold 562.

If the motor current 560 from current sensor 546 exceeds the threshold 562, comparator 544 may output a reset signal 574 to PWM speed controller 538. The application of reset signal 574 may cause PWM speed controller 538 to turn off PWM output 554 (e.g., by changing PWM output 554 to a duty cycle of 0%, setting PWM output 554 to zero, etc.) for a period of time or until comparator 544 indicates that motor current 560 no longer exceeds threshold 562. In other words, if the current threshold 562 for BLDC motor 550 is exceeded, comparator 544 may begin to interfere with PWM output 554 (e.g., by holding PWM output 554 in an off state), thereby causing BLDC motor 550 to slow down. Since the torque provided by BLDC motor 550 is proportional to motor current 560, both the electric current and torque of BLDC motor 550 can be limited by the application of reset signal 574.

The current threshold 562 may be controlled by main actuator controller 536. For example, threshold 562 may start as a digital value stored within main actuator controller 536 (e.g., a maximum torque threshold 568 or a maximum current threshold 570). Main actuator controller 536 may control threshold 562 by adjusting the thresholds 568 and/or 570 provided to PWM torque controller 540. Main actuator controller 536 may increase threshold 562 by increasing the maximum torque threshold 568 and/or the maximum current threshold 570. Main actuator controller 526 may decrease threshold 562 by decreasing the maximum torque threshold 568 and/or the maximum current threshold 570.

PWM torque controller 540 may be configured to generate a PWM output 572 based on the maximum torque 568 and/or maximum current 570 provided by main actuator controller 536. PWM torque controller 540 may convert the thresholds 568 and/or 570 to a PWM output 572 and provide the PWM output 572 to filter 542. Filter 542 may be configured to convert the PWM output 572 from PWM torque controller 540 into a current threshold 562 (e.g., a DC voltage representative of an electric current) for comparison to the output of current sensor 546 using a filter 542. In some embodiments, filter 542 is a first order low pass filter having a resistor in series with the load and a capacitor in parallel with the load. In other embodiments, filter 542 may be a low pass filter of a different order or a different type of filter.

In some embodiments, the threshold 562 provided to comparator 544 is based on a temperature sensor input. As the temperature sensor input varies (e.g., based on the changing ambient temperature, based on a temperature of a motor element, etc.), main actuator controller 536 may cause the threshold 562 to be adjusted. For example, as the temperature sensor input changes, main actuator controller 536 may adjust the thresholds 568 and/or 570 provided to PWM torque controller 540. Adjusting the thresholds 568 and/or 570 provided to PWM torque controller 540 may cause the duty cycle of PWM output 572 to change, which causes a corresponding change in the current threshold 562 output by filter 542.

In various embodiments, threshold 562 may be adjusted automatically by main actuator controller 536, adjusted by a user, or may be a static value. In some embodiments, threshold 562 is a static or dynamic value based on one or more variables other than ambient temperature. For example, threshold 562 may be set to a value that corresponds to the maximum current that can safely be provided to BLDC motor 550 or a maximum torque that can safely be provided by BLDC motor 550 to drive device 510.

Referring now to FIG. 9, motor drive inverter 548, BLDC motor 550, and current sensor 546 are shown in greater detail, according to some embodiments. Motor drive inverter 548 is shown to receiving PWM output 554 and phase switch outputs 556 for each of three phase lines of BLDC motor 550. Phase switch outputs 556 are shown to include a "Phase A High" output 556A, a "Phase A Low" output 556B, a "Phase B High" output 556C, a "Phase B Low" output 556D, a "Phase C High" output 556E, and a "Phase C Low" output 556F. Phase switch outputs 556 may be provided to switching elements 902. Switching elements 902 may be transistors configured to allow or deny current to flow through switching elements 902 from PWM output 554. Current sensor 546 is shown as a current sense resistor and may be configured to sense the motor current 560 provided to BLDC motor 550 regardless of the active winding.

Actuator with One-Way Clutch Motor

Figure 10A:
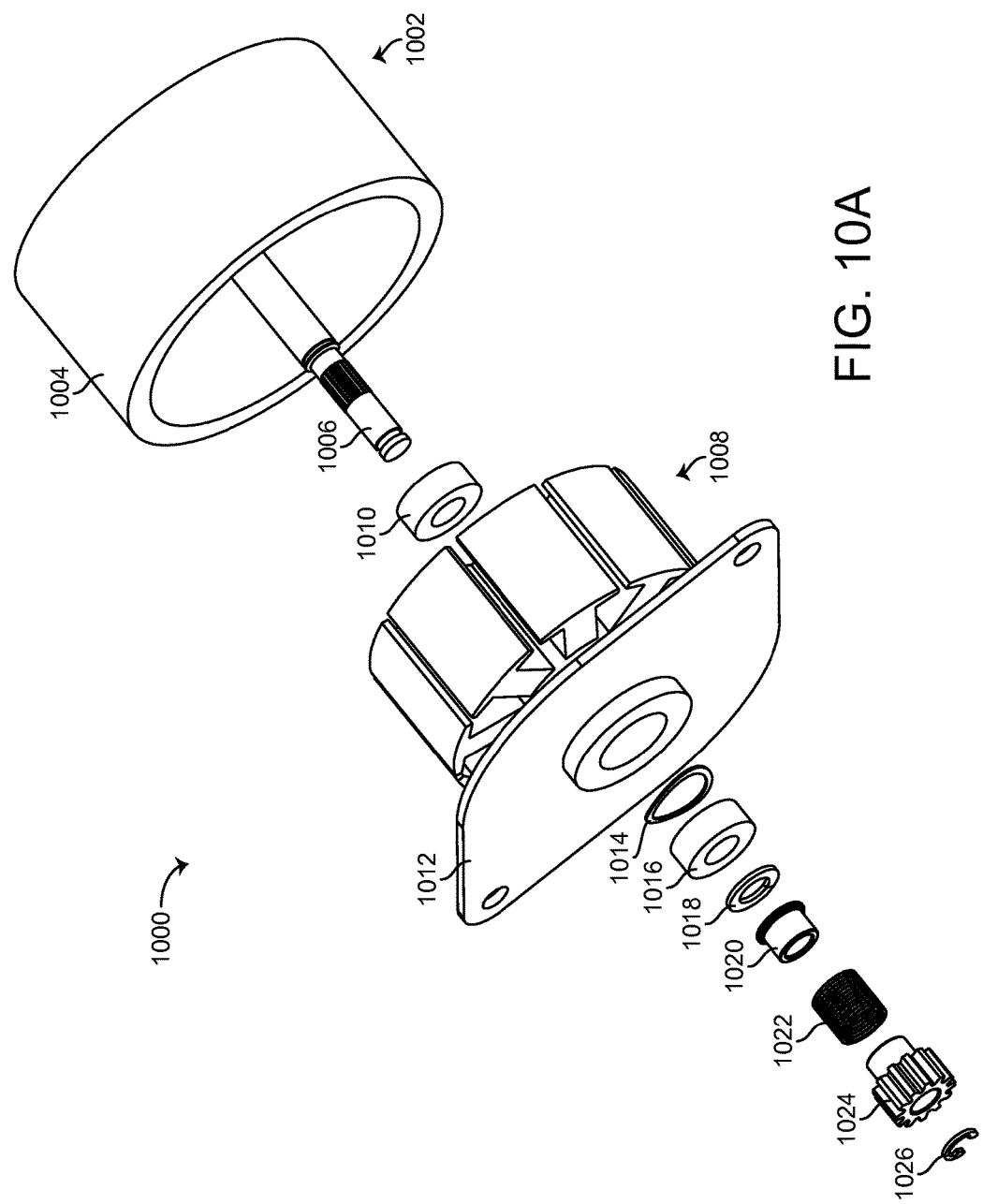
FIG. 10A is an exploded view of a motor assembly which may be used in the actuator of FIGS. 5-7, according to some embodiments.

Referring now to FIG. 10A, an exploded view of a previous one-way clutch motor assembly 1000 for an actuator is shown, according to some embodiments. Motor assembly 1000 can be used in actuator 500 and may be an embodiment of BLDC motor 550. Motor assembly 1000 is shown to have a bell assembly 1002. Bell assembly 1002 can provide a shell or housing for components of motor assembly 1000. For example, bell assembly 1002 can house shaft 1006, motor core 1008, etc. Bell assembly 1002 can be a single piece, or bell assembly 1002 can be separate pieces coupled to each other. Bell assembly 1002 is shown to include bell 1004 and shaft 1006. In some embodiments, bell assembly 1002 can be a single component, with bell 1004 and shaft 1006 manufactured as a single piece. In other embodiments, bell assembly 1002 can be an assembly in which shaft 1006 is pressed into bell 1004. Bell assembly 1002 can be arranged, constructed, and/or assembled in any way, and is not limited to ways specifically enumerated.

Bell 1004 can be manufactured as a single piece, and can house components of motor assembly 1000. Shaft 1006 can be a drive shaft. Shaft 1006 can transfer the rotational energy from a motor core (e.g., motor core 1008) to another component. In some embodiments, shaft 1006 is manufactured using a metal, metal alloy, etc. In other embodiments, shaft 1006 is manufactured using a material such as plastic (e.g., Teflon, PVC, etc.). Shaft 1006 can be manufactured using any material.

Referring still to FIG. 10A, motor assembly 1000 is shown to include motor core 1008. Motor core 1008 can be part of an electronically commutated motor and can be part of a synchronous motor that is powered by a DC electric source. In some embodiments, motor core 1008 is powered by an integrated inverter or switching power supply, which produces an AC electric signal to drive the motor. Motor core 1008 can be part of a permanent magnet synchronous motor. In some embodiments, motor core 1008 interfaces with bell assembly 1002 through roller bearing 1010. For example, roller bearing 1010 can allow rotation of motor core 1008 relative to shaft 1006. In some embodiments, motor core 1008 includes a mounting flange 1012. Mounting flange 1012 can be manufactured from any material, and can couple motor assembly 1000 to a desired mounting location.

Motor assembly 1000 is further shown to include wave washer 1014, roller bearing 1016, and retaining ring 1018. Wave washer 1014 can provide axial force to motor core 1008 and roller bearing 1016. In some embodiments, wave washer 1014 can be any other type of washer, and is not limited to being a wave washer. Roller bearing 1016 can provide an interface between motor core 1008 and bell assembly 1002. For example, roller bearing 1016 can allow rotation of motor core 1008 relative to shaft 1006, similarly to roller bearing 1010. In some embodiments, roller bearing 1016 can be the same type of bearing as roller bearing 1010. In other embodiments, roller bearing 1016 can be a type of bearing different from roller bearing 1010. Retaining ring 1018 can hold an assembly including bell assembly 1002, motor core 1008, roller bearing 1010, wave washer 1014, and roller bearing 1016 together. In some embodiments, each of the previously enumerated components is assembled to form one assembly. In other embodiments, some of the components are assembled. In some embodiments, retaining ring 1018 can be a snap ring. In other embodiments, retaining ring can be any type of retaining ring.

Referring still to FIG. 10A, motor assembly 1000 is further shown to a one-way clutch mechanism including sleeve 1020, spring 1022, pinion 1024, and retaining ring 1026. Sleeve 1020 can be a bushing. Sleeve 1020 can be pressed onto shaft 1006 and may be rotationally fixed to shaft 1006 such that shaft 1006 and sleeve 1020 rotate in unison. Sleeve 1020 can interface with spring 1022. In some embodiments, sleeve 1020 can provide a surface for spring 1022 to grip. Spring 1022 can interface with sleeve 1020 and pinion 1024. In some embodiments, spring 1022 is coupled to sleeve 1020 to fix its rotation relative to sleeve 1020. In other embodiments, spring 1022 is coupled to pinion 1024 to fix its rotation to pinion 1024.

In some embodiments, spring 1022 acts as a one-way clutch, driven by sleeve 1020. For example, the inner diameter of spring 1022 can decrease as motor core 1008 rotates in one direction, gripping pinion 1024 more tightly, until the rotation of pinion 1024 is completely restricted. The inner diameter of spring 1022 can increase as motor core 1008 rotates in a second direction opposite to the first direction, loosening its grip on pinion 1024 until the rotation of pinion 1024 is no longer restricted. The directional gripping of pinion 1024 causes pinion 1024 to rotate in unison with sleeve 1020 and shaft 1006 in the first direction, but allows pinion 1024 to rotate freely relative to sleeve 1020 and shaft 1006 in the second direction.

The grip of spring 1022 on pinion 1024 can necessitate manufacturing pinion 1024 from a material of equal or greater hardness to prevent damage and wear to pinion 1024. For example, if spring 1022 is manufactured from steel, pinion 1024 can be made from steel. The material choice for pinion 1024 can increase weight and cost of production. Pinion 1024 can engage an external gearbox. In some embodiments, pinion 1024 is a slip fit to shaft 1006 and is driven by spring 1022.

Referring still to FIG. 10A, retaining ring 1026 can hold the clutch assembly (e.g., sleeve 1020, spring 1022, and pinion 1024) to shaft 1006. In some embodiments, retaining ring 1026 is a c-clip that is assembled from the side. In other embodiments, retaining ring 1026 can be any other type of retaining ring. In some embodiments, components 1020-1026 of motor assembly 1000 are designed by the manufacturer. The manufacturer may be responsible for assembly, manufacturing labor, and quality control of many small components which may be difficult to install. Due to the small size of retaining ring 1026, installation and quality control can be difficult. In some cases, if retaining ring 1026 is not installed properly, pinion 1024 can slip off shaft 1006, which can result in unintended actuator operation.

Figure 10B:
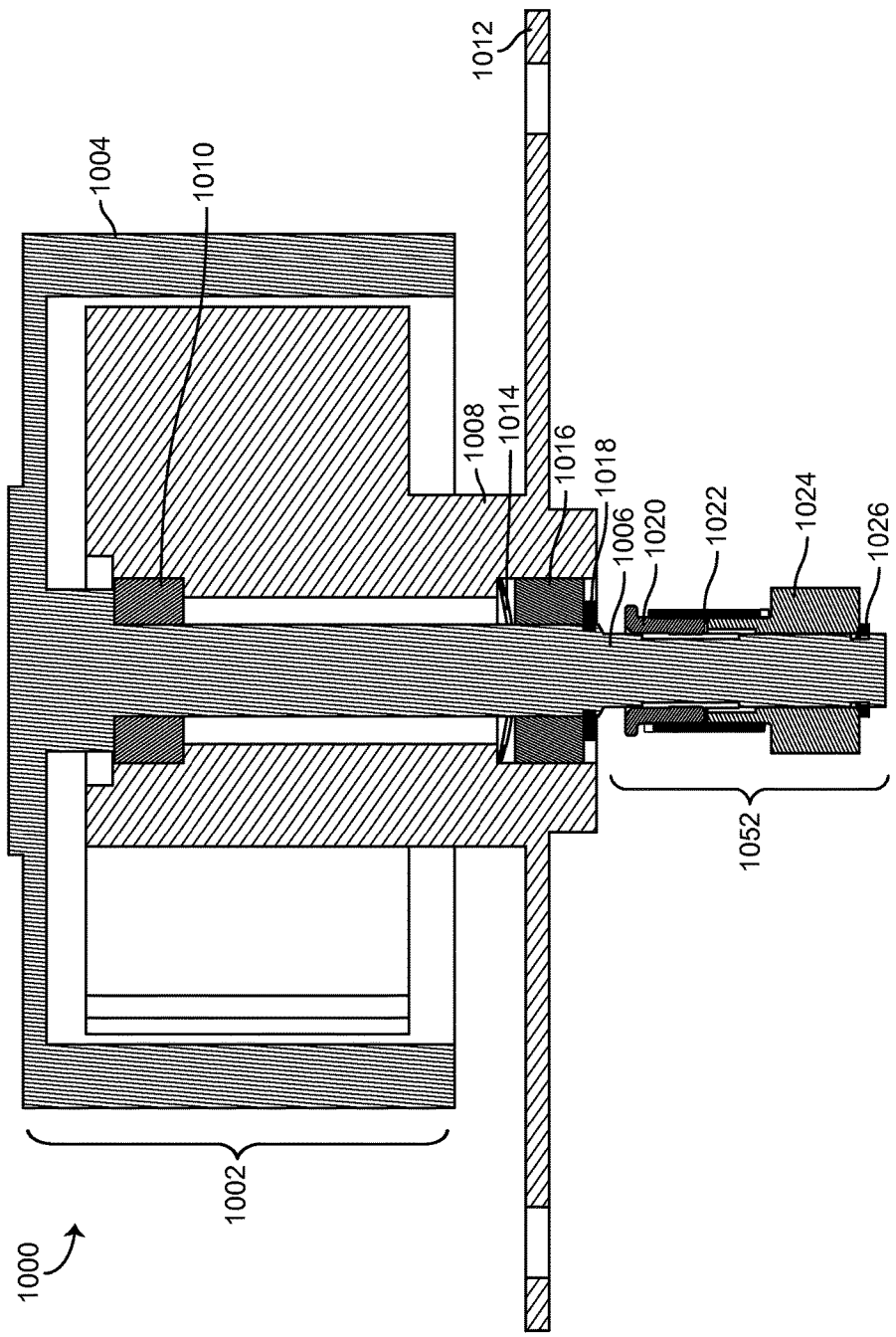
FIG. 10B is a cross-sectional view of the motor assembly shown in FIG. 10A, according to some embodiments.

Referring now to FIG. 10B, a cross-sectional view of one-way clutch motor assembly 1000 is shown according to some embodiments. FIG. 10B shows motor assembly 1000 in an assembled state and provides a view of interfaces between components of motor assembly 1000. It is shown that bell assembly 1002 (bell 1004 and shaft 1006) are manufactured as one piece. Bell 1004 is shown housing a portion of shaft 1006, motor core 1008, and roller bearing 1010. Clutch assembly 1052 (including sleeve 1020, spring 1022, pinion 1024, and retaining ring 1026) is shown external to bell assembly 1002. Retaining ring 1026 is shown holding pinion 1024 onto shaft 1006.

Figure 11A:
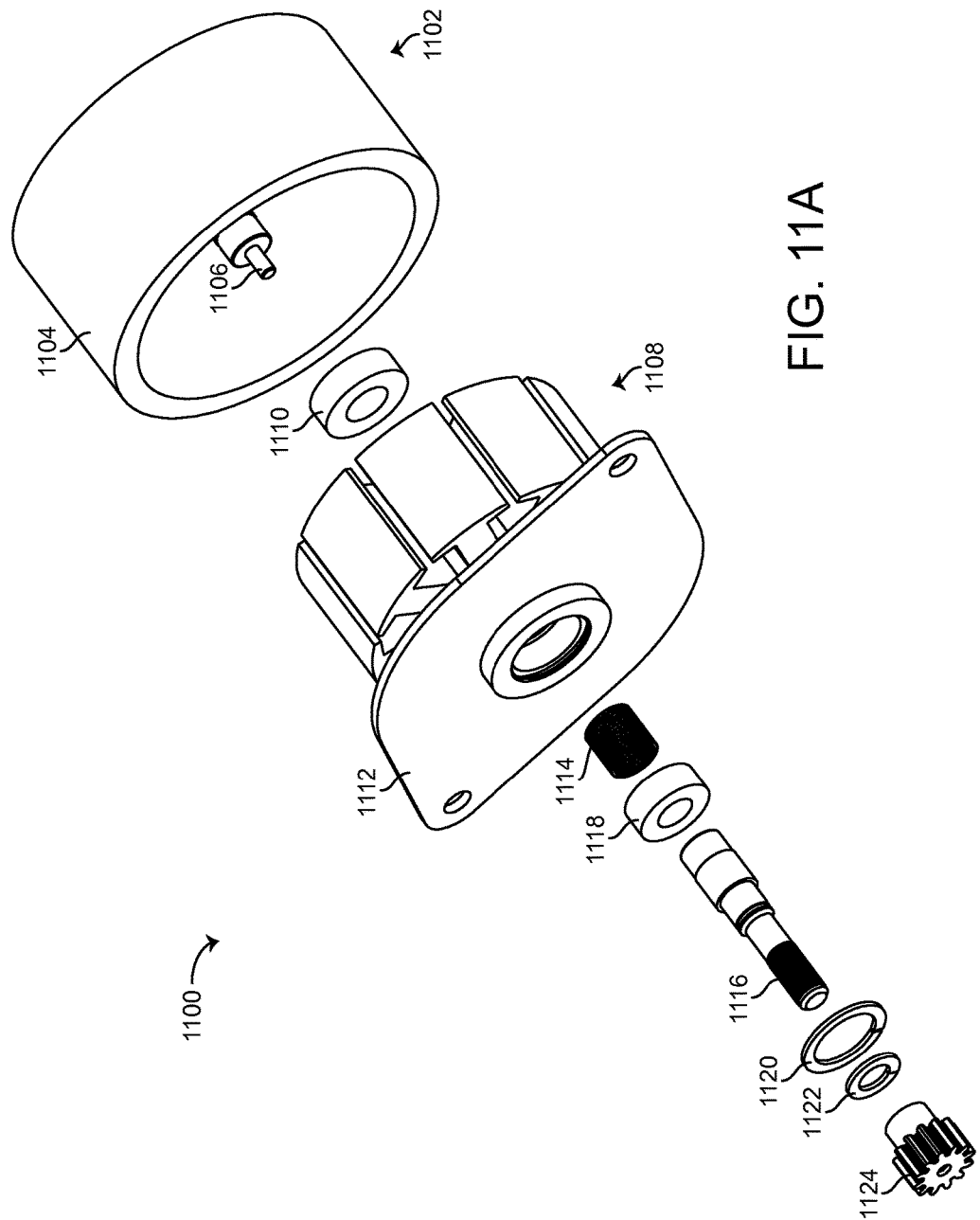
FIG. 11A is an exploded view of another motor assembly which may be used in the actuator of FIGS. 5-7, according to some embodiments.

Referring now to FIG. 11A, an exploded view of a new one-way clutch motor assembly 1100 for an actuator is shown according to some embodiments. Motor assembly 1100 can be used in actuator 500 and may be an embodiment of BLDC motor 550. Motor assembly 1100 is shown to include a bell assembly 1102. Bell assembly 1102 can provide a shell or housing for components of motor assembly 1100. In some embodiments, bell assembly 1102 forms a shell which defines an outer perimeter of motor assembly 1100. Bell assembly 1102 can be a single piece, or bell assembly 1102 can be separate pieces coupled to each other. For example, bell assembly 1102 is shown to include bell 1104 and upper shaft 1106. In some embodiments, bell assembly 1102 is manufactured as one piece. In other embodiments, bell assembly 1102 can be an assembly which includes bell 1104 and upper shaft 1106. Upper shaft 1106 may be a rotor shaft configured to rotate when an electric current is applied to the motor. Upper shaft 1106 can be pressed into bell 1104 and may be contained entirely within bell 1104 (e.g., entirely within the shell defined by bell 1104). Bell assembly 1102 can be arranged, constructed, and/or assembled in any way, and is not limited to ways specifically enumerated.

Referring still to FIG. 11A, motor assembly 1100 is shown to include motor core 1108 and roller bearing 1110. Motor core 1108 can be part of an electronically commutated motor and can be part of a synchronous motor that is powered by a DC electric source. In some embodiments, motor core 1108 is powered by an integrated inverter or switching power supply, which produces an AC electric signal to drive the motor. Motor core 1108 can be part of a permanent magnet synchronous motor. In some embodiments, motor core 1108 interfaces with bell assembly 1102 and/or upper shaft 1106 through roller bearing 1110. For example, roller bearing 1110 can allow rotation of motor core 1108 relative to upper shaft 1106. In some embodiments, motor core 1108 includes a mounting flange 1112. Mounting flange 1112 can be manufactured from any material, and can couple motor assembly 1100 to a desired mounting location.

Referring still to FIG. 11A, motor assembly 1100 is shown to include spring 1114. Spring 1114 can interface with bell assembly 1102 and/or upper shaft 1106 and lower shaft 1116. In some embodiments, spring 1114 acts as a one-way clutch, driven by upper shaft 1106. For example, the inner diameter of spring 1114 can decrease as motor core 1108 rotates in one direction, gripping lower shaft 1116 more tightly, until the rotation of lower shaft 1116 is completely restricted. The inner diameter of spring 1114 can increase as motor core 1108 rotates in a second direction opposite to the first direction, loosening its grip on lower shaft 1116 until the rotation of lower shaft 1116 is no longer restricted. In some embodiments, spring 1114 is coupled to upper shaft 1106 to fix its rotation to upper shaft 1106. In other embodiments, spring 1114 is coupled to lower shaft 1116 to fix its rotation to lower shaft 1116.

Referring still to FIG. 11A, motor assembly 1100 is shown to include lower shaft 1116. Lower shaft 1116 can be a drive shaft. Lower shaft 1116 can be located partially within the shell defined by bell 1104 and partially outside the shell defined by bell 1104. In other words, lower shaft 1116 may extend through the shell. Lower shaft 1116 may be coupled to drive device 510 via pinion 1124. In some embodiments, lower shaft 1116 is assembled with a free fit on upper shaft 1106. Lower shaft 1116 can transfer the rotational energy from a motor core (e.g., motor core 1108) to another component. In some embodiments, lower shaft 1116 is manufactured using a metal, metal alloy, etc. In other embodiments, lower shaft 1116 is manufactured using a material such as plastic (e.g., Teflon, PVC, etc.). Lower shaft 1116 can be manufactured using any material. In some embodiments, lower shaft 1116 is driven by spring 1114 or slips through spring 1114.

The interaction between spring 1114 and lower shaft 1116 provides a one-way clutch mechanism. Unlike the previous embodiment shown in FIGS. 10A-B, the one-way clutch mechanism is located within bell assembly 1102 instead of external to bell assembly 1102. For example, spring 1114 may be contained within the shell defined by bell 1104 and may be configured to rotatably couple lower shaft 1116 to upper shaft 1106 within the shell. Since spring 1114 does not grip pinion 1124, it is not necessary to manufacture pinion 1124 from a material of equal or greater hardness compared to the material of spring 1114.

Referring still to FIG. 11A, motor assembly 1100 is further shown to include roller bearing 1118, retaining ring 1120, and retaining ring 1122. Roller bearing 1118 can provide an interface between lower shaft 1116 and motor core 1108. For example, roller bearing 1118 can allow rotation of motor core 1108 relative to lower shaft 1116, providing a similar interface as the interface provided by roller bearing 1110 between upper shaft 1106 and motor core 1108. In some embodiments, roller bearing 1118 can be the same type of bearing as roller bearing 1110. In other embodiments, roller bearing 1118 can be a type of bearing different from roller bearing 1110. Retaining ring 1120 can hold roller bearing 1118 within motor core 1108. Retaining ring 1122 can hold lower shaft 1116 to roller bearing 1118. In some embodiments, retaining rings 1120 and 1122 can be snap rings. In other embodiments, retaining rings 1120 and 1122 can be any type of retaining rings. The outer diameter of retaining ring 1122 can be smaller than the inner diameter of retaining ring 1120 such that retaining ring 1122 is inside of retaining ring 1120 when assembled.

Referring still to FIG. 11A, motor assembly 1100 is further shown to include pinion 1124. As pinion 1124 no longer interfaces with a spring (e.g., spring 1114), pinion 1124 can be made of any material. In some embodiments, pinion 1124 is made of plastic—a low cost, light material. Pinion 1124 can be molded instead of machined, extruded, etc. In some embodiments, pinion 1124 is press fit to lower shaft 1116, which results in pinion 1124 being rotationally fixed to lower shaft 1116. Press fitting pinion 1124 to lower shaft 1116 eliminates the need for using a small retaining ring which may be difficult to install. Such a configuration was not possible in motor assembly 1000 while maintaining the operation of a one-way clutch since the entire shaft 1006 was fixed to bell assembly 1002. However, since the shaft in motor assembly 1100 both an upper shaft 1106 and a lower shaft 1116, pinion 1124 can be rotationally fixed to lower shaft 1116 while preserving the one-way clutch action relative to upper shaft 1106.

In some embodiments, pinion 1124 and the assembly of pinion 1124 to the rest of motor assembly 1100 can be the only components a manufacturer would need to provide. The other components can be purchased as an assembly, reducing stress on the manufacturer regarding quality control and manufacturing labor. Press fitting pinion 1124 onto lower shaft 1116 results in a simpler manufacturing process and eliminates the need to add a small retaining ring to hold pinion 1124 onto lower shaft 1116 (as was required in motor assembly 1000).

Figure 11B:
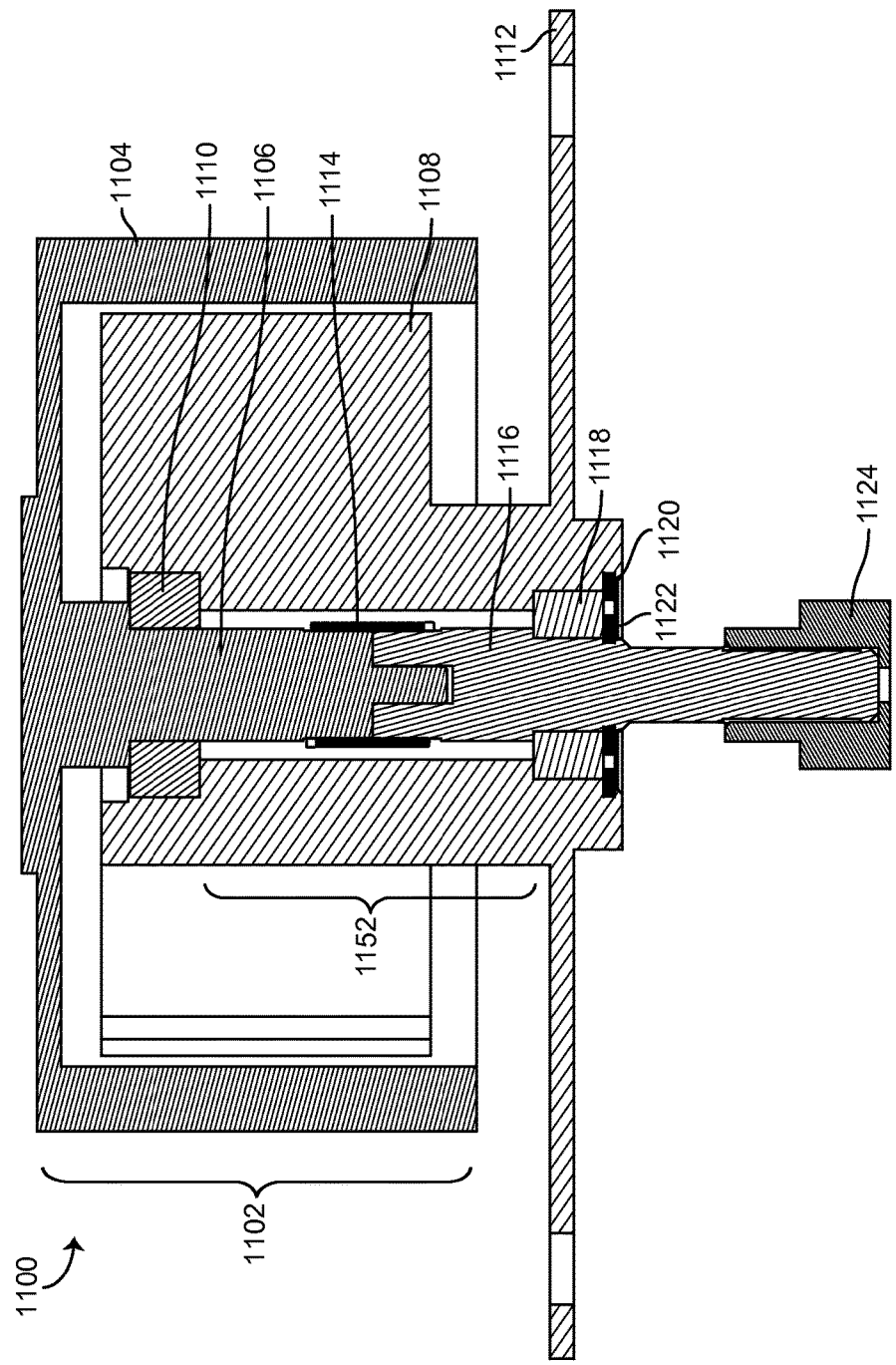
FIG. 11B is a cross-sectional view of the motor assembly shown in FIG. 11A, according to some embodiments.

Referring now to FIG. 11B, a cross-sectional view of one-way clutch motor assembly 1100 is shown according to some embodiments. FIG. 11B shows assembly 1100 in an assembled state and provides a view of interfaces between components of motor assembly 1100. In some embodiments, bell assembly 1102 (bell 1104 and upper shaft 1106) are separate pieces press-fit together. In other embodiments, bell assembly 1102 is manufactured as on piece. Bell 1104 and motor core 1108 are shown housing all components of motor assembly 1100 except a portion of lower shaft 1116 and pinion 1124. Clutch assembly 1152 (including upper shaft 1106, spring 1114, and lower shaft 1116) is shown internal to bell assembly 1102 and/or motor core 1108. The reduced complexity of motor assembly 1100 and relocation of clutch assembly 1152 inside bell assembly 1102 provides a safer assembly with fewer parts for the manufacturer to assemble and reduces the likelihood of motor failure.

Figure 12:
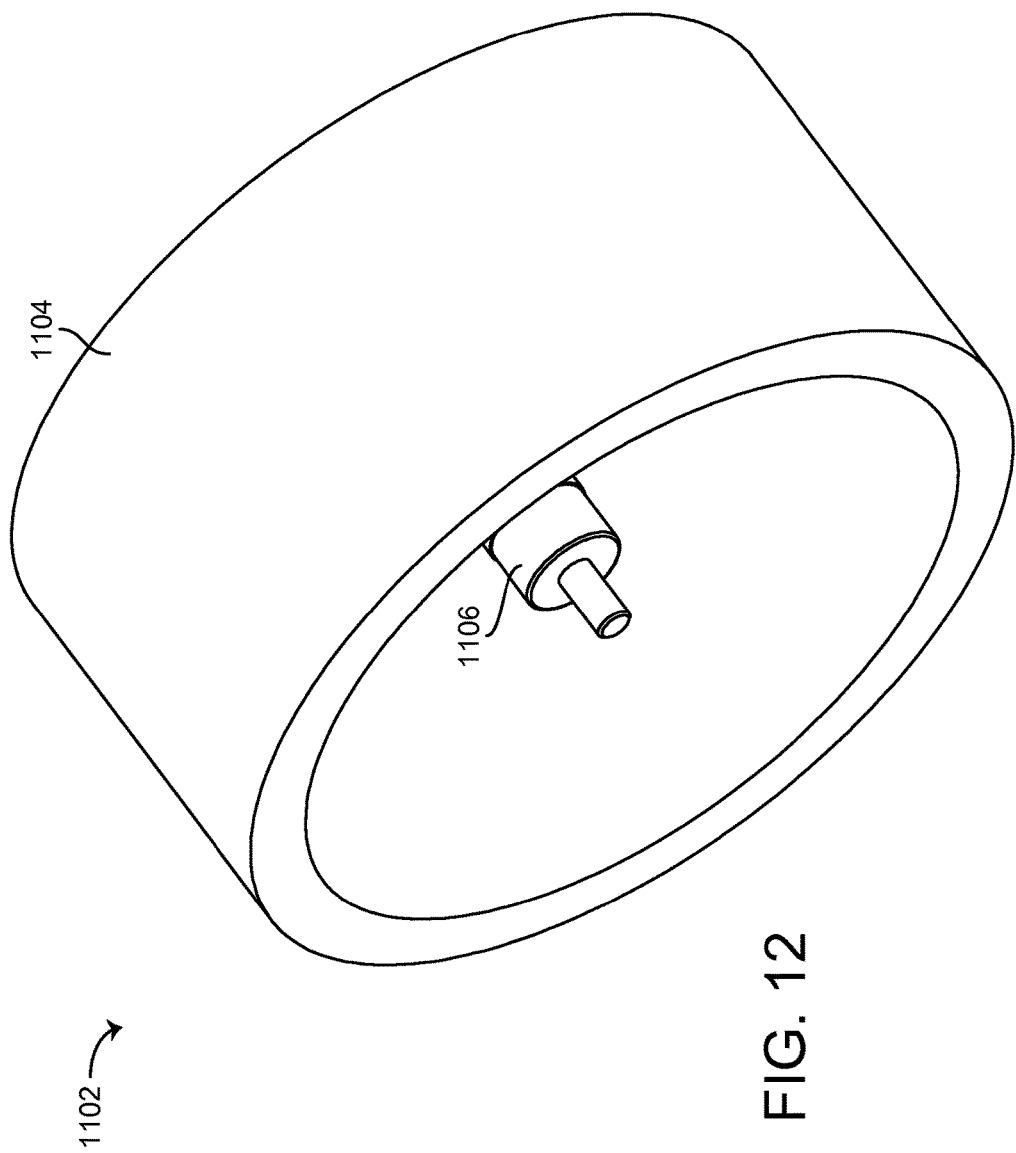
FIG. 12 is a perspective view of a bell assembly which may be used in the motor assemblies shown in FIGS. 10A-11B, according to some embodiments.

Referring now to FIG. 12, bell assembly 1102 is shown in greater detail, according to some embodiments. Bell assembly 1102 is shown to include bell 1104 and upper shaft 1106. Bell assembly 1102 can provide a shell or housing for components of a motor assembly. Bell assembly 1102 can be a single piece, or bell assembly 1102 can be separate pieces coupled to each other. In some embodiments, bell assembly 1102 is manufactured as a single component, such that bell 1104 and upper shaft 1106 are manufactured as one piece. In other embodiments, bell assembly 1102 can be an assembly which includes bell 1104 and upper shaft 1106. Upper shaft 1106 can be press-fit to bell 1104. In some embodiments, upper shaft 1106 can be coupled to bell 1104 using a positive retention means, such as a bolt and a nut, etc. Bell assembly 1102 can be assembled or manufactured in any way.

Figure 13:
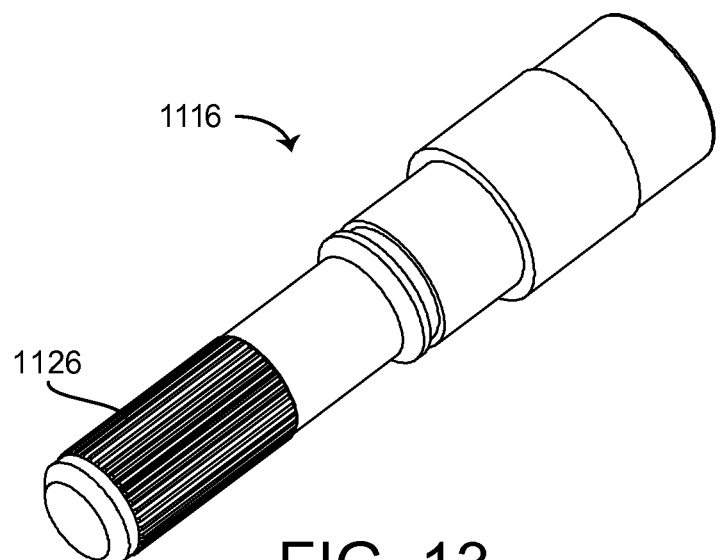
FIG. 13 is a perspective view of a drive shaft which may be used in the motor assembly shown in FIGS. 11A-11B, according to some embodiments.

Referring now to FIG. 13, lower shaft 1116 is shown in greater detail, according to some embodiments. In some embodiments, lower shaft 1116 is coupled to another shaft (e.g., upper shaft 1106 of FIGS. 11A-B). In some embodiments, lower shaft 1116 is a slip-fit, free-fit, etc. to upper shaft 1106. Lower shaft 1116 may be held to upper shaft 1106 by a spring (e.g., spring 1114), a bearing (e.g., roller bearing 1118), and/or retaining rings (e.g., retaining rings 1120 and 1122). In some embodiments, lower shaft 1116 is manufactured from metal. In other embodiments, lower shaft 1116 is manufactured from any material. Lower shaft 1116 is shown to have external splines 1126. In some embodiments, lower shaft 1116 is coupled to pinion 1124. Pinion 1124 can have corresponding internal splines which mesh with external splines 1126. In other embodiments, pinion 1124 is broached such that external splines 1126 create internal splines in pinion 1124.

Figure 14:
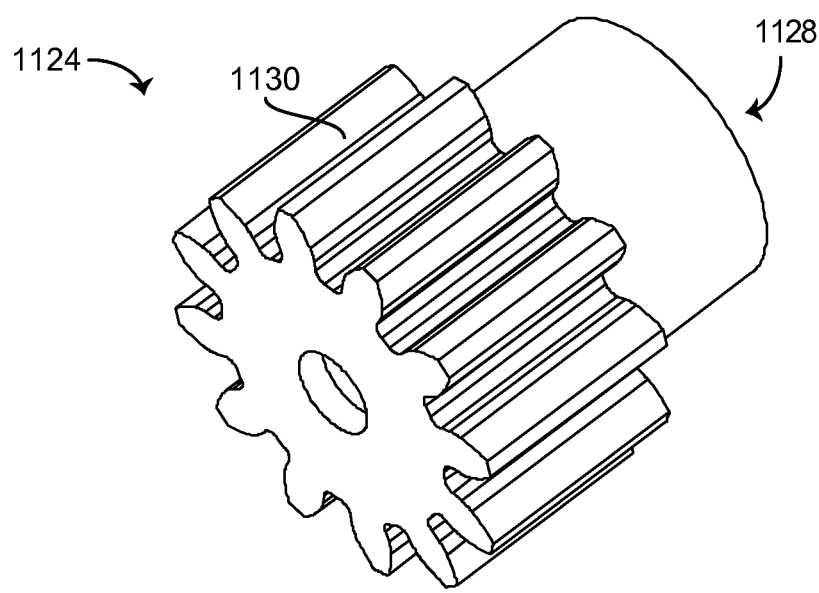
FIG. 14 is a perspective view of a pinion gear which may be used in the motor assembly shown in FIGS. 11A-11B, according to some embodiments.

Referring now to FIG. 14, pinion 1124 is shown in greater detail, according to some embodiments. In some embodiments, pinion 1124 is coupled to a shaft (e.g., lower shaft 1116 of FIGS. 11A-B). Pinion 1124 can be press-fit to lower shaft 1116 by inserting lower shaft 1116 into a bore 1128 located at one end of pinion 1124. In some embodiments, pinion 1124 has internal splines which correspond to external splines of lower shaft 1116. Pinion 1124 can be manufacture from any material. In some embodiments, pinion 1124 is manufactured from a plastic material (e.g., Teflon, PVC, etc.). Since pinion 1124 does not experience wear or stress from interacting with a spring (e.g., spring 1114), pinion 1124 does not need to be metal and can be made of a less rigid material such as a polymer. Pinion 1124 is shown to include gear teeth 1130 which can mesh with corresponding gear teeth of a gear box within actuator 500 to rotationally couple pinion 1124 to drive device 510.

The one-way clutch mechanism provided by clutch assembly 1152 rotationally couples pinion 1124 to bell assembly 1102 in a first rotational direction, but allows relative rotation between pinion 1124 and bell assembly 1102 in a second rotational direction. For example, when motor core 1108 is powered, bell assembly 1102 and upper shaft may be driven in the first direction (e.g., clockwise) relative to motor core 1108. As bell assembly 1102 rotates in the first direction, spring 1114 may grip both upper shaft 1106 and lower shaft 1116, causing lower shaft 1116 to rotate in the first direction in unison with upper shaft 1106. In other words, the one-way clutch mechanism engages both upper shaft 1106 (i.e., the rotor shaft) and lower shaft 1116 (i.e., the drive shaft) when upper shaft 1106 rotates in the first direction such that lower shaft 1116 is driven by upper shaft 1106 in the first direction.

Pinion 1124 can be rotationally fixed to lower shaft 1116 (e.g., via a press-fitting) which causes pinion 1124 to rotate in the first direction in unison with lower shaft 1116. Pinion 1124 can be coupled to drive device 510 which causes actuator 500 to drive in the first direction as pinion 1124 is rotated. The one-way clutch action provided by clutch assembly 1152 may allow pinion 1124 to continue rotating in the first direction after bell assembly 1102 stops rotating. However, continued rotation of pinion 1124 in the first direction may be opposed by a return spring.

In some embodiments, actuator 500 is a spring return actuator. For example, actuator 500 may include a return spring configured to wind (e.g., store energy) as actuator 500 drives in the first direction. The return spring can apply a torque to drive device 510 in a second rotational direction (e.g., counterclockwise). When motor core 1108 is not powered, the torque provided by the return spring may cause drive device 510 to rotate in the second direction toward a counterclockwise end position (e.g., a zero position). Rotation of drive device 510 in the second direction drives pinion 1124 in the second direction, which causes lower shaft 1116 to rotate in the second direction. As lower shaft 1116 rotates in the second direction, spring 1114 may grip both upper shaft 1106 and lower shaft 1116, causing upper shaft 1106 and bell assembly 1102 to rotate in the second direction in unison with lower shaft 1116.

The one-way clutch action provided by clutch assembly 1152 may allow upper shaft 1106 and bell assembly 1102 to continue rotating in the second direction after lower shaft 1116 stops rotating. For example, lower shaft 1116 may stop rotating once drive device 510 reaches the counterclockwise end position and encounters a physical end stop. In some instances, drive device 510 and lower shaft 1116 suddenly stop rotating once the end stop is reached (e.g., upon impacting the end stop). The rotational momentum of bell assembly 1102 may cause bell assembly 1102 and upper shaft 1106 to continue rotating in the second direction relative to lower shaft 1116. One-way clutch assembly 1152 permits such rotation by allowing upper shaft 1106 to slip relative to lower shaft 1116 when upper shaft 1106 rotates in the second direction. Such slippage allows the rotational momentum of bell assembly 1102 to gradually decrease rather than forcing bell assembly 1102 to stop suddenly. This feature reduces the impact force experienced when the end stop is reached and reduces the stress on the rotating components of actuator 500 (e.g., gear box components, pinion 1124, etc.).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An actuator in a heating, ventilation, and air conditioning (HVAC) system, the actuator comprising:
    a drive device configured to attach to a movable HVAC component and to drive the movable HVAC component between multiple positions; and
    a motor coupled to the drive device to provide torque to the drive device in a first direction; and
    a return spring coupled to the drive device to provide torque to the drive device in a second direction opposite the first direction,
    the motor comprising:
        a shell defining an outer perimeter of the motor;
        a rotor shaft contained within the shell and configured to rotate when an electric current is applied to the motor;
        a drive shaft extending through the shell and coupled to the drive device; and
        a one-way clutch contained within the shell and rotatably coupling the rotor shaft to the drive shaft;
        wherein the one-way clutch is configured to permit the rotor shaft to slip relative to the drive shaft when rotating in the second direction to gradually dissipate a rotational inertia of the motor after the drive device stops upon reaching an end stop.

2. The actuator of claim 1, wherein the one-way clutch is configured to:
    engage both the rotor shaft and the drive shaft when the rotor shaft rotates in the first direction such that the drive shaft is driven by the rotor shaft in the first direction, and
    slip relative to at least one of the rotor shaft and the drive shaft when the rotor shaft rotates in the second direction opposite the first direction to allow rotation of the rotor shaft relative to the drive shaft in the second direction.

3. The actuator of claim 1,
    wherein the torque provided by the return spring causes the drive device to move toward the end stop and to drive the motor in the second direction;
    the end stop defining an end of a mechanical range of motion for at least one of the drive device and the movable HVAC component.

4. The actuator of claim 3, wherein:
    the motor gains rotational inertia as the motor is driven in the second direction;
    the drive device is configured to stop upon reaching the end stop; and
    the one-way clutch is configured to allow continued rotation of the motor in the second direction after the drive device stops to gradually dissipate the rotational inertia of the motor.

5. The actuator of claim 1, further comprising a pinion gear rotatably fixed to an end of the drive shaft outside the shell and configured to drive the drive device.

6. The actuator of claim 5, wherein the pinion gear is injection molded from a polymer material and press fit onto the end of the drive shaft.

7. The actuator of claim 1, wherein the one-way clutch comprises a wrap spring wrapped around an end of the rotor shaft and an end of the drive shaft; and
    the wrap spring is fixed to one of the rotor shaft and the drive shaft and configured to slip relative to the other of the rotor shaft and the drive shaft when the rotor shaft rotates in the second direction.

8. The actuator of claim 1, wherein:
the shell comprises an outer rotor configured to rotate when the electric current is applied to the motor; and
the rotor shaft and the outer rotor are formed as a single piece.

9. The actuator of claim 1, further comprising:
stator windings contained within the shell; and
a flange coupled to the stator windings and defining a surface of the shell.

10. The actuator of claim 9, wherein:
the stator windings comprise a central axial channel; and
the rotor shaft, the drive shaft, and the one-way clutch are at least partially contained within the central axial channel.

11. The actuator of claim 10, further comprising:
a first bearing located within the central axial channel and configured to facilitate rotation of the rotor shaft relative to the stator windings; and
a second bearing located within the central axial channel and configured to facilitate rotation of the rotor shaft relative to the stator windings.

12. An actuator in a heating, ventilation, and air conditioning (HVAC) system, the actuator comprising:
a drive device configured to attach to a movable HVAC component and to drive the movable HVAC component between multiple positions; and
a motor comprising a rotor shaft and a one-way clutch, the motor configured to provide torque to the drive device in a first direction;
wherein torque is provided to the drive device in a second direction opposite the first direction by a return spring; and
wherein the one-way clutch is configured to couple the rotor shaft to the drive device when the rotor shaft rotates in the first direction and to allow the rotor shaft to slip relative to the drive device when the rotor shaft rotates in the second direction to gradually dissipate a rotational inertia of the motor after the drive device stops upon reaching an end stop.

13. The actuator of claim 12, further comprising a pinion gear rotatably fixed to an end of a drive shaft outside a perimeter of the motor and configured to drive the drive device.

14. The actuator of claim 12, wherein:
the motor comprises an outer rotor configured to rotate when the electric current is applied to the motor; and
the one-way clutch is contained within a perimeter of the outer rotor.

15. The actuator of claim 12,
wherein the torque provided by the return spring causes the drive device to move toward the end stop and to drive the motor in the second direction;
the end stop defining an end of a mechanical range of motion for at least one of the drive device and the movable HVAC component.

16. The actuator of claim 15, wherein:
the motor gains rotational inertia as the motor is driven in the second direction; and
the drive device is configured to stop upon reaching the end stop.

17. The actuator of claim 12, wherein:
the motor further comprises a drive shaft rotatably coupled to the drive device and configured to drive the drive device; and
the one-way clutch comprises a wrap spring wrapped around an end of the rotor shaft and an end of the drive shaft.

18. The actuator of claim 17, wherein the wrap spring is configured to:
engage both the rotor shaft and the drive shaft when the rotor shaft rotates in the first direction such that the drive shaft is driven by the rotor shaft in the first direction; and
slip relative to at least one of the rotor shaft and the drive shaft when the rotor shaft rotates in the second direction to allow rotation of the rotor shaft relative to the drive shaft in the second direction.

* * * * *